United States Patent [19]
Francisco

[11] Patent Number: 5,185,866
[45] Date of Patent: Feb. 9, 1993

[54] DUAL MODE COMMUNICATION AMONG PLURALITY OF PROCESSORS USING THREE DISTINCT DATA CHANNELS EACH HAVING DIFFERENT FUNCTION AND OPERATIONS

[75] Inventor: Robert Francisco, New Fairfield, Conn.

[73] Assignee: Pitney Bowes Inc., Stamford, Conn.

[21] Appl. No.: 292,058

[22] Filed: Dec. 30, 1988

[51] Int. Cl.$^5$ .................... G06F 13/12; G06F 13/38; G06F 13/00

[52] U.S. Cl. .................... 395/325; 395/200; 364/DIG. 2; 364/230.4; 364/241.9; 364/260; 364/474.11; 364/927.98; 364/931.4; 364/942.4; 364/DIG. 1; 371/8.2; 371/11.2

[58] Field of Search ... 364/200 MS File, 900 MS File, 364/478, 474.11; 271/3.1; 53/540; 270/58; 371/8.2, 11.2; 395/200, 325

[56] References Cited

U.S. PATENT DOCUMENTS

| | | | |
|---|---|---|---|
| 3,519,264 | 7/1970 | Beacham et al. | 270/58 |
| 3,578,310 | 5/1971 | Carson, Jr. | 270/54 |
| 4,004,277 | 1/1977 | Gavril | 364/200 |
| 4,041,469 | 8/1977 | Jennings | 364/900 |
| 4,047,158 | 9/1977 | Jennings | 364/900 |
| 4,064,561 | 12/1977 | Jennings | 364/900 |
| 4,169,341 | 10/1979 | Roetter et al. | 53/154 |
| 4,354,229 | 10/1982 | Davis et al. | 364/200 |
| 4,432,458 | 2/1984 | Dabouh | 209/564 |
| 4,471,954 | 9/1984 | Bourg | 270/58 |
| 4,484,273 | 11/1984 | Stiffler et al. | 364/200 |
| 4,490,788 | 12/1984 | Rasmussen | 364/200 |
| 4,497,040 | 1/1985 | Gomes | 364/900 |
| 4,517,650 | 5/1985 | Gomes | 364/478 |
| 4,525,788 | 6/1985 | Gottlieb et al. | 364/478 |
| 4,527,468 | 7/1985 | Piotroski | 101/2 |
| 4,527,790 | 7/1985 | Piotroski | 270/58 |
| 4,527,791 | 7/1985 | Piotroski | 270/58 |
| 4,547,846 | 10/1985 | Gottlieb | 364/138 |
| 4,547,856 | 10/1985 | Piotroski et al. | 364/478 |
| 4,562,535 | 12/1985 | Vincent et al. | 364/200 |
| 4,564,901 | 1/1986 | Tomlinson et al. | 364/200 |
| 4,568,072 | 2/1986 | Piotroski | 270/58 |
| 4,571,925 | 2/1986 | Adams | 53/502 |
| 4,589,063 | 5/1986 | Shah et al. | 364/200 |
| 4,595,980 | 6/1986 | Innes | 364/200 |
| 4,604,690 | 8/1986 | Crabtree et al. | 364/200 |
| 4,608,631 | 8/1986 | Stiffler | 364/200 |
| 4,615,002 | 9/1986 | Innes | 364/200 |
| 4,636,947 | 1/1987 | Ward | 364/200 |
| 4,638,451 | 1/1987 | Hester et al. | 364/900 |
| 4,639,873 | 1/1987 | Baggarly et al. | 364/466 |
| 4,646,245 | 2/1987 | Prodel et al. | 364/468 |
| 4,732,261 | 3/1988 | Mattern et al. | 198/422 |
| 4,771,374 | 9/1988 | Ropelato | 364/130 |
| 4,837,704 | 6/1989 | Lengefeld | 364/478 |
| 4,870,590 | 9/1989 | Kawata et al. | 364/468 |
| 4,914,574 | 4/1990 | Terada et al. | 364/200 |

Primary Examiner—Thomas C. Lee
Assistant Examiner—Krisna Lim
Attorney, Agent, or Firm—Charles R. Malandra, Jr.; Melvin J. Scolnick

[57] ABSTRACT

A material processing system comprising a plurality of material processing stations and means for transporting articles to be processed serially through the processing stations in a given order, the improvement comprising a central processing station computer, a plurality of peripheral processing stations, each of the peripheral processing stations including a microprocessor, a first data channel serially interconnecting each of the peripheral processing station computers with the central processing station computer, a second data channel connecting each of the peripheral processing station computers directly with the central processing station computers, and a third data channel interconnecting each of the peripheral processing station computers with its next adjacent peripheral processing station computers, each of the channels performing a different data processing operation for controlling the serial processing for transporting articles.

6 Claims, 15 Drawing Sheets

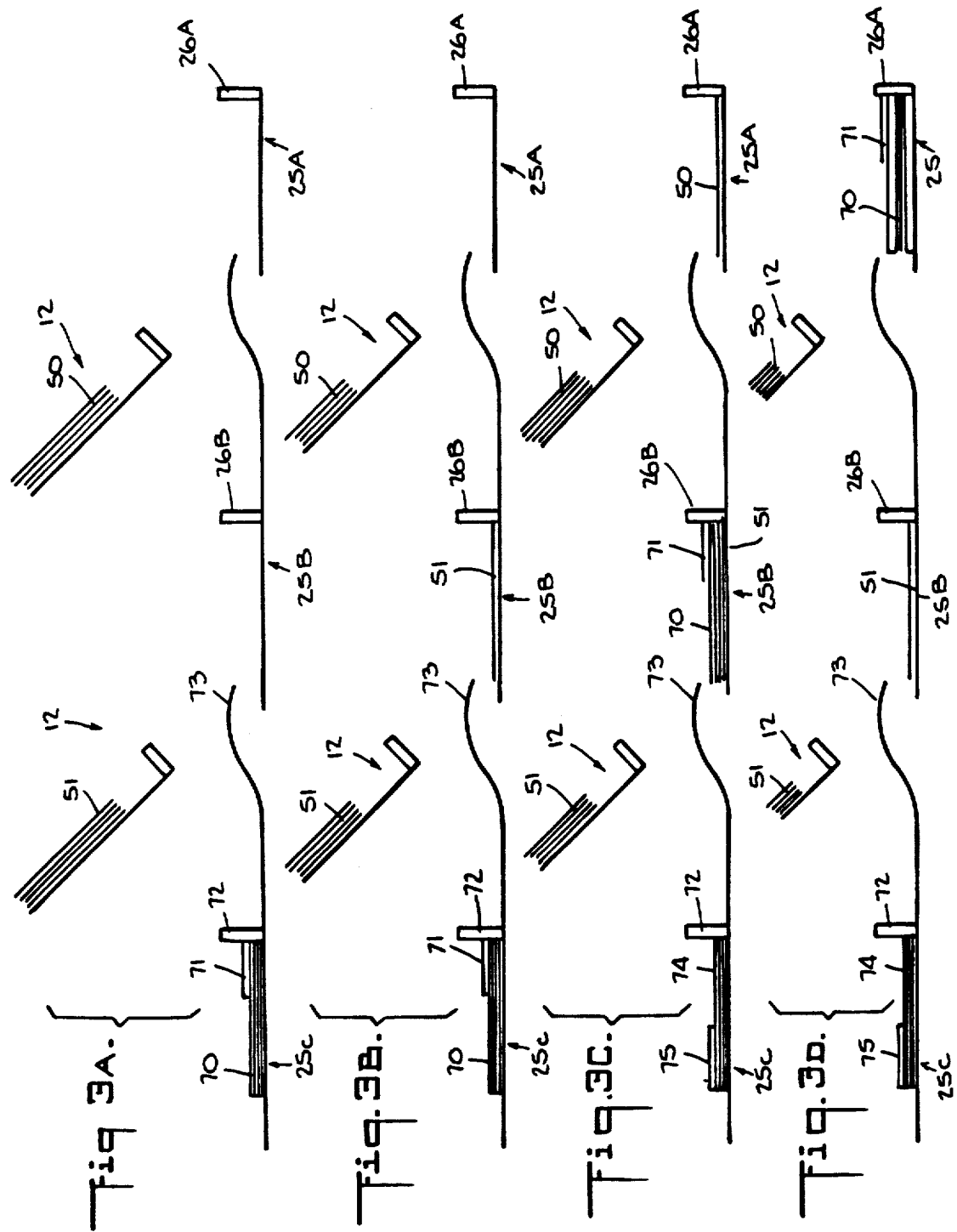

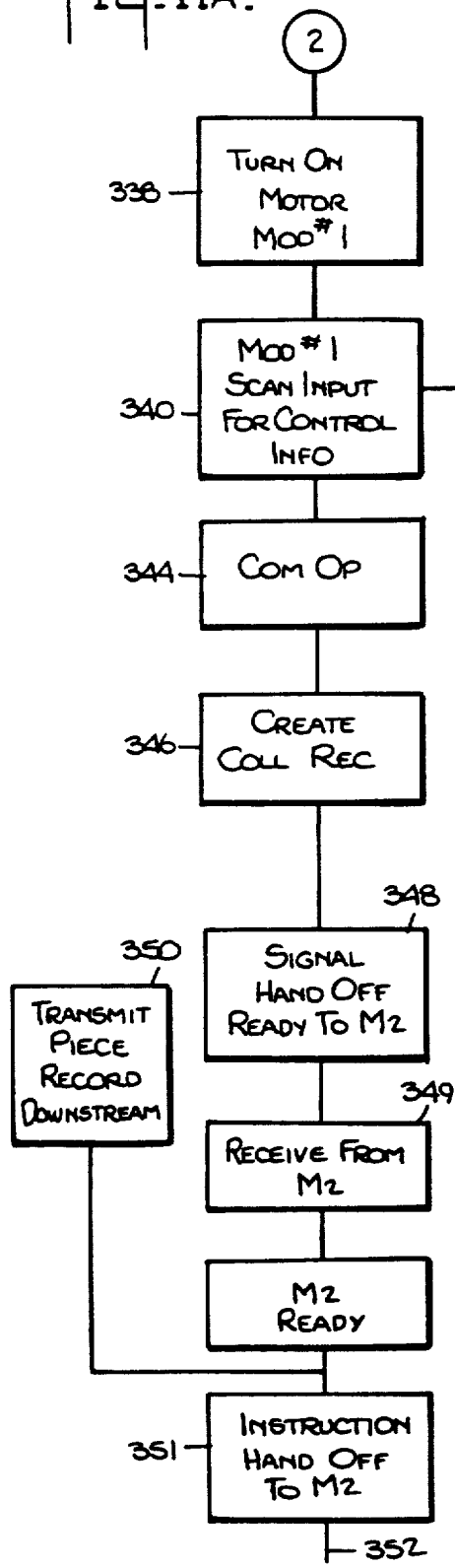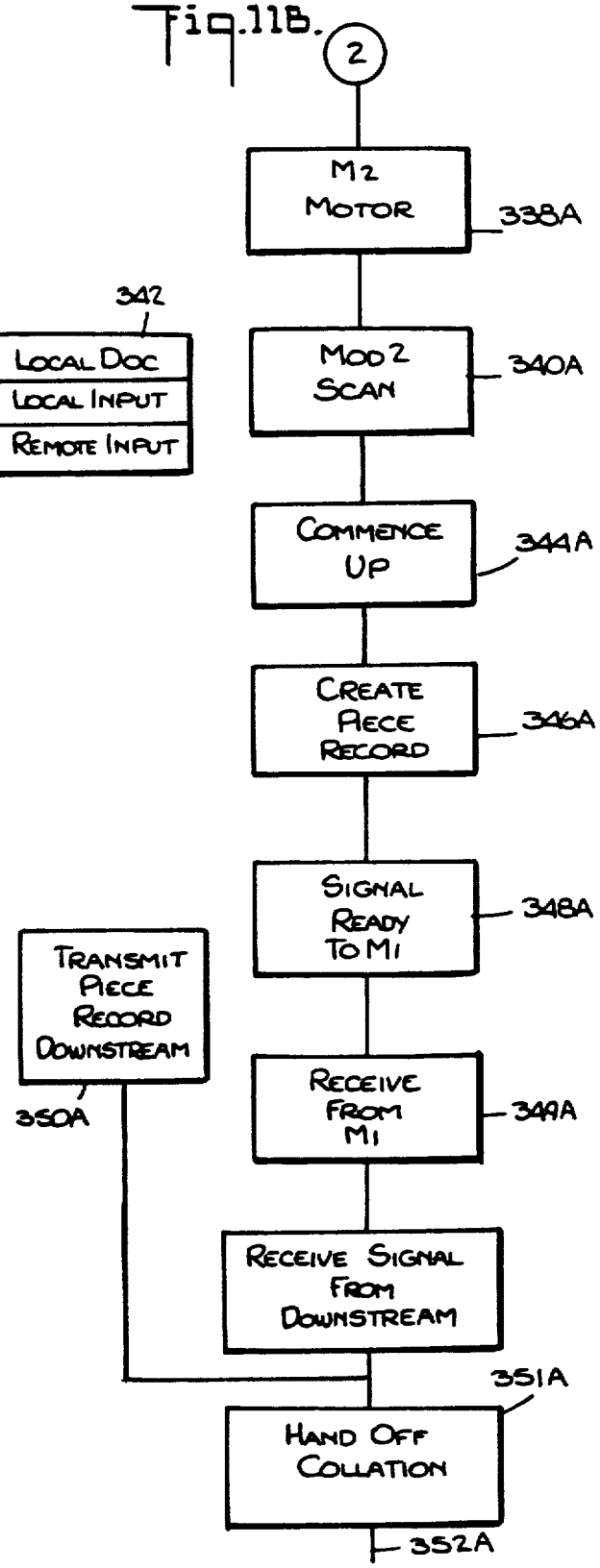

DUAL MODE COMMUNICATION AMONG PLURALITY OF PROCESSORS USING THREE DISTINCT DATA CHANNELS EACH HAVING DIFFERENT FUNCTION AND OPERATIONS

RELATED APPLICATIONS

The following related applications refer to subject matter related to the subject matter of this application:

U.S. application Ser. No. 07/279,000 filed on Dec. 2, 1988, now U.S. Pat. No. 4,928,807, issued on May 29, 1990;

U.S. application Ser. No. 07/242,566 filed on Sep. 12, 1988, now U.S. Pat. No. 4,852,334, issued on Aug. 1, 1989;

U.S. application Ser. No. 07/281,607 filed on Dec. 9, 1988, now U.S. Pat. No. 5,006,194, issued on Apr. 9, 1991;

U.S. application Ser. No. 07/292,613 filed on Dec. 30, 1988, now U.S. Pat. No. 5,003,485, issued on Mar. 26, 1991;

U.S. application Ser. No. 07/292,156 filed on Dec. 30, 1988, now U.S. Pat. No. 4,970,654, issued on Nov. 13, 1990;

U.S. application Ser. No. 07/292,060 filed on Dec. 30, 1988, now U.S. Pat. No. 5,146,587, issued on Sep. 8, 1992;

U.S. application Ser. No. 07/292,157 filed on Dec. 30, 1988, now U.S. Pat. No. 4,962,623, issued on Oct. 16, 1990;

U.S. application Ser. No. 07/292,616 filed on Dec. 30, 1988, now U.S. Pat. No. 4,942,535, issued on Jul. 17, 1990;

U.S. application Ser. No. 07/292,059 filed on Dec. 30, 1988;

U.S. application Ser. No. 07/292,150 filed on Dec. 30, 1988, now U.S. Pat. No. 4,992,950 issued on Feb. 12, 1991.

FIELD OF THE INVENTION

This invention relates to document collating and envelope stuffing machines, and in particular to an automatic machine of the foregoing type capable of higher speeds and increased reliability and flexibility.

BACKGROUND OF THE INVENTION

U.S. Pat. No. 4,169,341 describes an automatic document collating and envelope stuffing machine comprising a main flow path employing a continuous conveying mechanism to an envelope stuffing station, in which one or more feeding stations deposit documents onto a platform associated with each feeding station. The documents in each platform are picked up seriatim by the conveying mechanism and subsequently stuffed into envelopes. The feeding stations are, each in parallel with the main conveying mechanism, which operates continuously to pick up whatever documents are present on each feeder platform.

While this machine operates satisfactorily for its intended purpose, it does have certain inadequacies which limit its flexibility and speed. For example, the speed is determined solely by the main conveying mechanism, which proceeds at the same velocity even though documents are not present on the platforms. Moreover, it is difficult to keep track of the collation contents from station to station. Still further, it is difficult, if not impossible, to employ a single address document with coding to indicate the collation contents which can control each of the feeding stations in turn.

Particularly, it is difficult to establish a communication protocol between modules in a modular insertion system which will permit maximum speed of operation while not restricting the manner in which modules inter-communicate. This is an important aspect for features such as queuing, pass collations, rejecting erroneous collations, passing error messages recognizing and adding new modules without the requirements of changing switches or re-programming memory, and multi-language capability for non-English language countries.

DESCRIPTION OF THE PRIOR ART

The patents to Tomlinson et al U.S. Pat. No. 4,564,901 and Ward U.S. Pat. No. 4,636,947 each relate to parallel processing systems utilizing concurrent data transfer, the former specifically directed to asynchronously intercoupled microprocessors.

Prodel et al (U.S. Pat. No. 4,646,245) and Ropelato (U.S. Pat. No. 4,771,374) relate to modular manufacturing and process controls; Stiffler et al (U.S. Pat. Nos. 4,608,631 and 4,484,273) teach modular computer systems per se; Crabtree et al (U.S. Pat. No. 4,604,690) provides for dynamic reconfiguring of a data processing system for added devices; and Shah et al (U.S. Pat. No. 4,589,063) and Vincent et al (U.S. Pat. No. 4,562,535) disclose automatic configuration in single computer systems.

The patent to Davis et al (U.S. Pat. No. 4,354,229) shows a loop initialization process.

The patent to Innes (U.S. Pat. Nos. 4,615,002 and 4,595,908) relates to the multilingual features.

SUMMARY OF INVENTION

An object of the invention is a document collating and envelope stuffing machine that can operate at high speeds.

A further object of the invention is a document collating and envelope stuffing machine that provides complete control of the collation contents.

Another object of the invention is a document collating and envelope stuffing machine that is more flexible in its operation, by which is meant that the machine can control the contents of each collation by programming each feeder station, or by providing an address document coded with the collation contents which controls each feeder, or by an operator manually instructing each feeder station of the documents it is to contribute to the collation.

These and other objects and advantages as will appear hereinafter are achieved with a novel document collating and envelope stuffing apparatus characterized by a plurality of local feeding stations with each located in series in the main document flow path. Each local feeding station is provided with a local queuing station directly in the main flow path. Each feeding station, in turn, captures the global collation created by the previous upstream feeding stations, adds if desired one or more documents to the collation, and then passes on to the next downstream station the resultant global collation. A computer record is kept of the global collation, and as documents are added the computer record is updated and passed on to the next feeding station. The basic system may be called on-demand feeding. Each local feeding station in turn notifies the next local feeding station when its collation is complete so that the next feeding station is prepared to accept and contribute its own documents if desired to the global collation. The last feeding station, on demand, then feeds the resultant global collation to the envelope stuffing station, which can be followed if desired by a flap moistening and sealing station and ultimately by a sorter or postage machine if desired. In accordance with another feature of the invention, the accumulated collation record is checked for completeness, and if incomplete, the stuffed envelope is ejected from the main flow path.

This invention is also directed to a material processing system comprising a plurality of material processing stations, and mans for transporting articles to be processed serially through the processing stations in a given order; the improvement wherein each of the processing stations comprises a data and control processing system, and further comprising a communication path interconnecting each the data and control processing system with the data and control processing system of the next preceding and next succeeding material processing station in the given order; each the data and control processing system comprising means for controlling material processing at the respective station, means for signaling the data and control processing system of the next previous station that the respective station is ready to receive material to be processed therefrom, and means for directing data to the data control and processing system of the next succeeding station concerning material processing steps that have been taken in the respective station on material to be passed to the next succeeding station as well as data it may have received from the data and control processing system of the next previous station concerning material processing steps that had previously been taken on the material to be passed to the next succeeding station.

Principal benefits derivable from the machine of the invention include:

1) the ability to add on additional feeding stations as modules without changing the basic operation. These additional feeders can include sheet feeders, bursters, which separate individual sheets from perforated fan-folded continuous paper, folders and like document handling apparatus;

2) the speed of the machine is not fixed, but is instead dependent primarily on the time required for each local contribution to the collation. Thus, if no local contribution is made, no unnecessary delays are encountered at that feeding station;

3) the collation record which is passed on from station to station is kept up to date and provides a reliable record of the collation contents at every station in the machine.

4) the up-to-date collation record can readily be used to control subsequent machine operations, such as ejection in case of a defective collation;

5) if an address document is used, it retains its position on top of the collation stack and thus can be readily scanned to control the machine, and, when the global collation is stuffed in the envelope, the address on the address document can be readily positioned to be visible through a window in the envelope.

The system employs asynchronous operation with no reciprocating motion. Previous inserter systems have operated asynchronously, but they have used a ram type reciprocating operation for insertion. This organization and structure reduces the vibration and noise and allows a lighter machine to be constructed. The queuing station arrangement and queuing device accumulates and holds documents in collation order until a down stream module calls for the collation to be transferred. If a jam is encountered in one station, jam clearing becomes much quicker because it is not necessary to disturb other collations in different module queuing stations, as all the other queue stations are in the wait state. The user only has to clear one station. A two belt system is employed for positive drive of collation through the insertion station. Positive high speed control is obtained by a continuous belt insertion drive mechanism. The continuous belt insertion provides a new form of insertion not previously used. Prior art devices use a large wheel with a small roller which has to be operated synchronously. The use of the same device for both conveying a collation and also inserting it into an envelope is unique. After insertion, the envelope is turned 90 degrees and sent to the next module for moistening and postage application. The device also provides for asynchronously operating the envelope turner in relation to the inserter operation. The asynchronous relationship between the envelope turner and the inserter allows the inserter to reject erroneous collations without having to operate the turner and other downstream equipment. The electronic control of the present invention uses a unique communication arrangement which combines command/response and peer to peer communications. When the system is on but not running in insert mode, the communication is a command/response, master/slave communication arrangement. This is a one-to-one command/response protocol where the master, the base envelope feeder microprocessor, retains command and control over the various inserter module microprocessors. However, while the system is running in insert mode, the communication technique changes to a peer to peer or module to module transfer mode wherein each module creates a record of its activity, known as a piece record, and passes it onto the next module. Master/slave communication is precluded during this mode of operation. Normal communications between modules during insert mode (not during, for example, a jam requiring user intervention) are transparent to the user. This allows the use of a single UART for dual purpose communications. It allows the throughput of large volumes of information because the processing is in parallel in each module and the data transfer throughout the modules is concurrent.

The system also allows for automatic configuration of equipment on power up, and generates (each time it powers up) the necessary operating configuration information of the equipment. Prior systems require a configuration PROM installed in the equipment. For each configuration change, a new configuration PROM had to be generated and physically changed. It should be noted that such equipment allowed the user to selected features within the configuration, but not to change the configuration itself.

The ring of topology of the present invention facilitates geographic addressing for module identification. The system employs a master controller operating in conjunction with the module computer. The system configuration analysis command from the master controller during the power up sequence requires each module in the inserter to send data back. Because of this arrangement, the base system will have stored therein the number of modules and their respective addresses. The base need not know the particular nature of the modules. This allows for the addition of new and as yet unknown modules to the system. The software architecture is such that all messaging is displayed on the base module (all inserter configurations have an envelope module). Because all messages that are displayed are generated by the various inserter modules and transmitted to the base module microprocessor for display on a display screen (in any language the operator selects) the system is flexible and allows the addition of new modules that do not presently exist. This permits module additions without having to change any of the existing software. Modules such as bar code readers, OCR readers, scanners, sorting devices, etc., can be easily added.

Error messages can also be passed from module to base unit directly without passing through other modules along the second channel communication line. Error messages are pre-stored in each module. The prestoring of error messages also allows the automatic selection of foreign language error messages.

The electronics in each module allow for generation of a piece record in software regarding each collation. A piece record is generated by the electronics and is passed from module to module, without passing through a master controller, asynchronously through the inserter, from one microprocessor to another. The piece record corresponds to the physical collation which is being moved from module to module. It represents an image of the physical collation. Because of this architecture, one can pass a large amount of data in block format from module to module. Modular prior art systems typically worked in a master slave relationship and the concept of direct module to module or peer to peer communication in this context is unique. The piece record is a dynamic data structure and accommodates different sizes of collations in different runs. The piece record is passed in a sequenced arrangement, module to module, but not necessarily passed between the modules synchronously with the physical movement of the documents. Since, the piece record is dynamic, it can include data for running a printer and/or any currently unknown or new I/O device.

A preferred embodiment of the invention will now be described in greater detail with reference to the accompanying drawings, wherein:

DESCRIPTION OF THE DRAWINGS

FIGS. 3a, 3b, 3c and 3d illustrate schematically the asynchronous operation of the apparatus of FIG. 1;

FIGS. 11A and 11B are flow charts illustrating the program routine and system flow within a module.

DESCRIPTION OF THE PREFERRED EMBODIMENT

Figure 1:
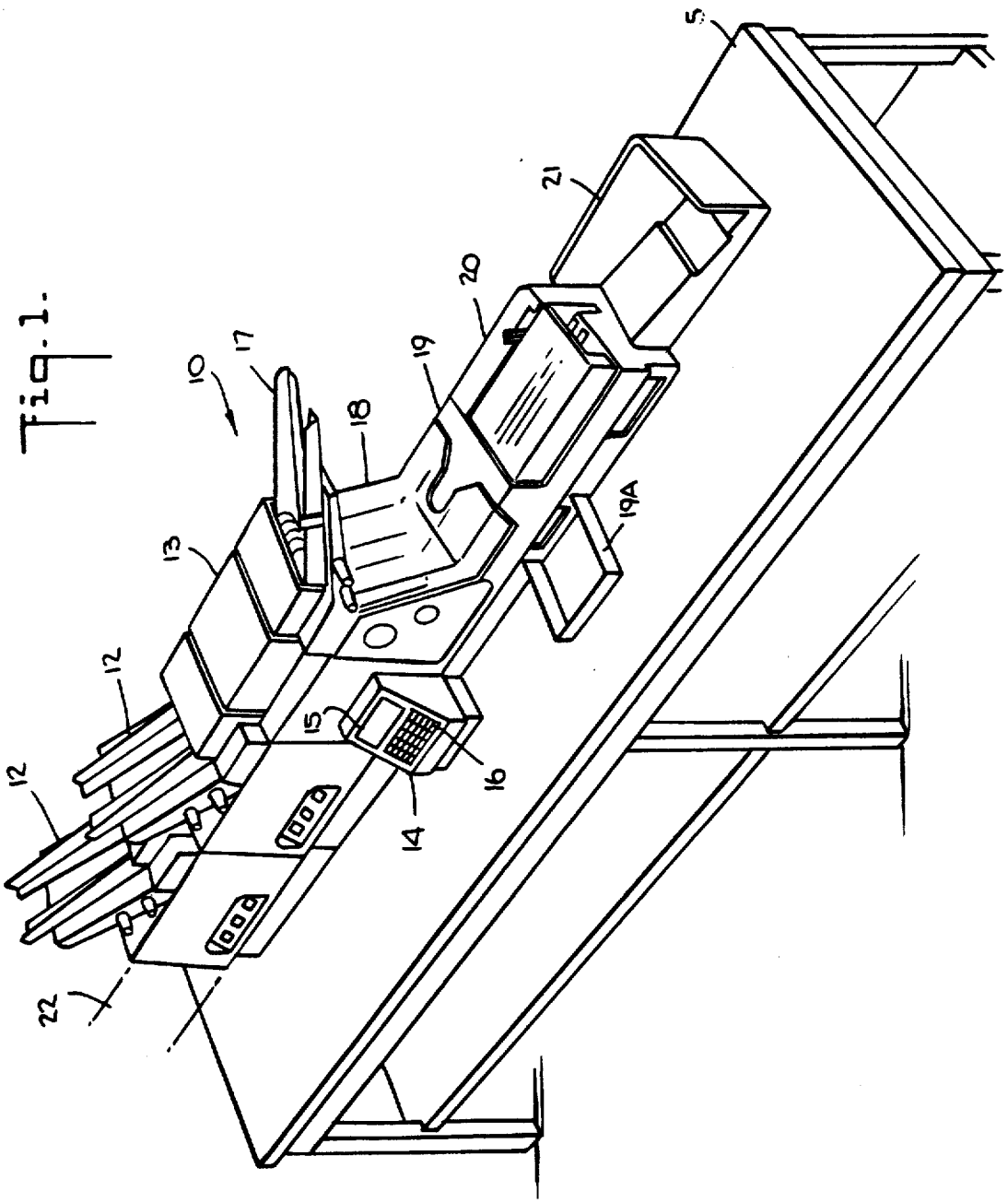
FIG. 1 is a perspective view of one form of apparatus in accordance with the invention.

FIG. 1 of the drawings show a perspective view on a table 5 of the machine 10 of the invention provided with two document feeding stations 12, feeding station keyboard for data entry 12a, a transport station 13, electronics control station 14, with associated message display screen 15 and data key board 16, an envelope feeding station 17, an envelope stuffing station 18, a turning and ejection station 19, a moistener and sealing station 20, and a stacking station 21. Although only two document feeding stations are shown it will be appreciated that many more feeding stations can be added on to the front end of the machine, which has been indicated by the dashed lines 22 shown at the left end, and the operation of the overall machine does not change. Such feeding stations or modules include bursting and folding modules also. The ability to add additional modules without the necessity of reconfiguring both mechanisms and the central electronics is an important feature of the novel machine of the invention. The keyboard 16 is used to provide operator input as to start, operating instructions, reset functions and the like. The display 15 is employed to show error messages, module status, echo keyboard instructions and the like.

The following detailed description will be more understandable with the brief description of the underlying concepts and operation of the machine now outlined. Each feeding station is independent of other feeding stations and its operation is controlled by a local microprocessor. Each feeding station, of which one or more may be included in the machine, is typically provided with a hopper for storing a stack of documents, and a plurality of sensors connected to its local microprocessor for controlling the feeding of one or more of its documents to the global collation, and signalling the receipt and departure of the global collation. Each feeding station contains a queuing station for temporarily capturing and holding the global collation.

When the queuing station of the current feeding station is empty, its local microprocessor is signaled and deposits into its local queuing station the one or more documents it is instructed to contribute. This instruction may come manually from an operator through the keyboard located on the side of the feeder, be programmed into the local microprocessor through the base unit keyboard, or be derived from a coded address document, typically the top document of the collation, which has been read by a scanner at an upstream feeding station and the information passed on to the local feeding station. When the local contribution is completed, the upstream microprocessor is signaled to send down the so-far accumulated global collation, which is accomplished by opening a gate at the previous queuing station and activating a feeder mechanism which then deposits the global collation on top of the local contribution at the current queuing station. This process, it will be noted, ensures that an address document, previously on top of the collation, remains on top at the current queuing station. Each local microprocessor is passed in turn a collation record, which records the documents contributed to the global collation, and each microprocessor in turn updates the collation record and passes it downstream to the next feeding station, or, if the last, to the envelope stuffing station. When the global collation is completed at the current feeding station, the next downstream feeding station or envelope stuffing station is informed. The global collation remains at the current queuing station until the next downstream station is ready to receive the global collation. This is the basis for the on-demand feeding label, which is essentially an asynchronous operation in which local stations control the collation feeding while within the local domain, i.e., its local queuing station. There is also a main computer or microprocessor which can communicate with each of the stations in the machine, but the collation record is transferred directly from local microprocessor to local microprocessor, instead of via the main computer The operation of the envelope stuffing machine is similarly locally controlled by the state of the immediately upstream feeding station, except that any defects in the collation records passed on to it will result in ejection of that stuffed enveloped from the main flow path.

Figure 2:
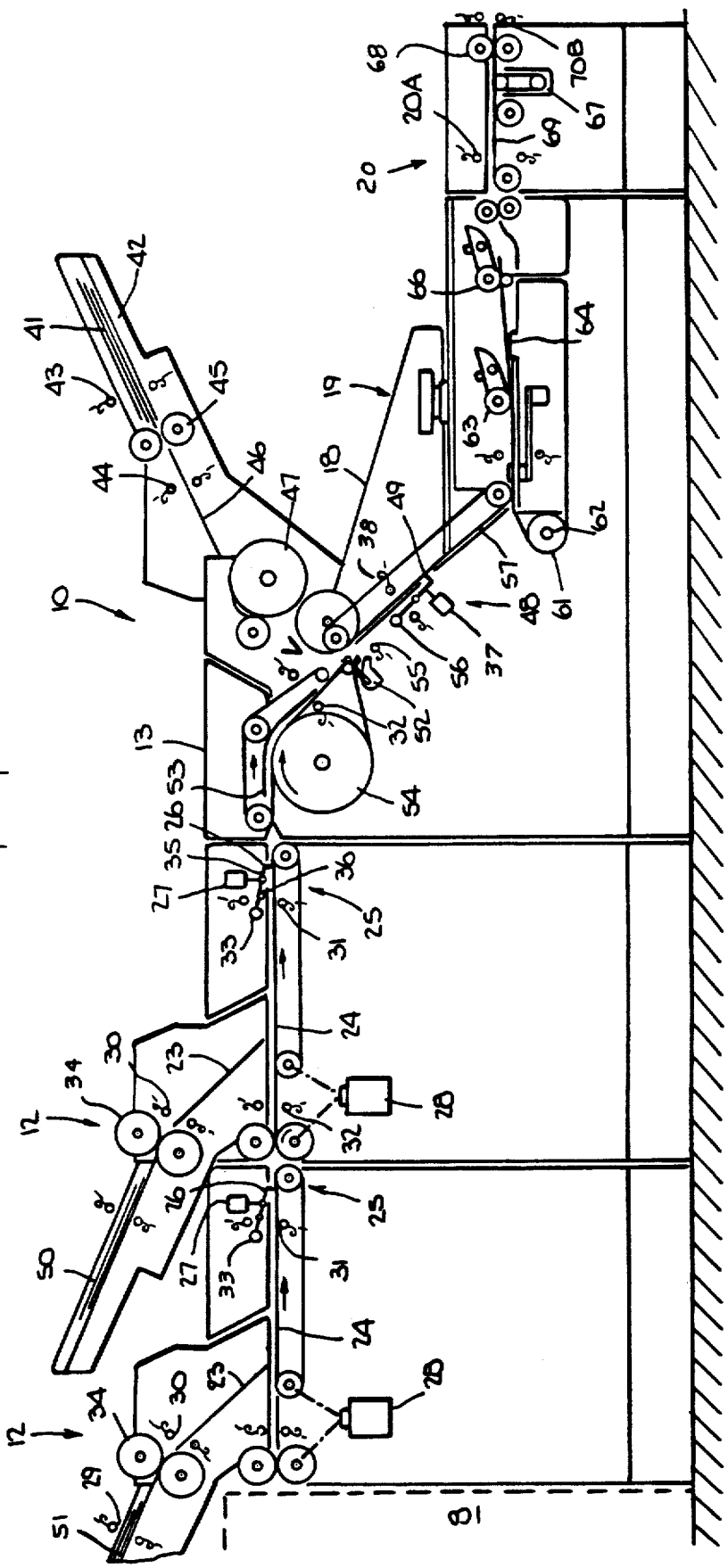
FIG. 2 is a schematic side of the apparatus of FIG. 1 showing the main document transfer devices and sensors.

The schematic side view of FIG. 2 provides cross-sectional detail of the modules of FIG. 1. Each feeding station 12 comprises a hopper for stacking a supply of documents designated 50 at the first station and 51 at the second station. The operation of both feeders 12 is the same, hence the description given below for the second feeder applies equally to the first. Transport means shown as rollers 34 feed one or more documents from the stack 51 down an inclined deck 23 onto a transport means shown as a belt drive 24. The belt drive is preferably two parallel belts, 24A and 24B (not shown), which provide positive high speed drive control on each side of the documents. At the right end of the belt drive 24 is a queuing station 25, represented by a gate 26 which blocks advance of documents and a solenoid 27 for lifting the gate 26 to allow documents to advance to the next downstream station. The queuing station also includes a pressure roller 33. The queuing station operation is a two-step process, involving rotary motion of the station arm 35 about the pivot point 36. The document transport is via the belt drive 24 which is blocked by the gate 26. When the downstream module is ready to receive the document or documents resident at the queuing station, the solenoid 27 is activated, causing rotation of arm 35 about the pivot 36, and causing the gate 26 to rise out of its position blocking movement of the documents and placing pressure roller 33 down, forcing the document against the belt 24, resulting in transport of the document by the belt 24 to the next module. The rollers 34 are activated by a motor (not shown) and the transport 24 by a motor 28. Since a dual belt drive is used, the queuing station is duplicated on both sides of the document, once for each belt. This arrangement is duplicated in every module queuing station.

A plurality of sensors are present, such as, for example, optical sensors that can detect the presence or passage of a document. The sensors in FIG. 2 are shown as units spaced across the document path, typically a light emitter and a photo-detector operating in a transmission mode (well known in the art) for clarity, but combined emitter-detectors operating in a reflective mode (also well known in the art) are preferred. Typically, each place where documents stand or pass is provided with a sensor to keep track of the document flow. Thus, each hopper has an input sensor 29 to determine the presence of stacked documents, and an output sensor 30 for detecting the leading and trailing edge of passing documents to know how many have passed and when. Similarly, the queuing stations 25 each have an input sensor 31 to know when documents arrive, and an output sensor 32 to know when they have left. This sensor arrangement is repeated in each module in the system.

The envelope stuffer 18 has been described in detail in copending application Ser. No. 242,566, filed on Sep. 12, 1988, now U.S. Pat. No. 4,852,334, issued on Aug. 1, 1989, assigned to the assignee of the present invention and incorporated herein by reference, and need not be repeated For present purposes, only the flow is necessary. The envelopes 41, stacked on a hopper 42 with the usual input 43 and output 44 sensors, are fed by roller transport means 45 down an inclined deck 46 through transport means 47 where each envelope is stopped at queuing station 48 comprising a gate 49 and gate-opening solenoid 37. Sensor 38 is the input sensor for queuing station. When the envelope is stopped at the gate, finger grabbers 52 are activated to open the envelope, with the result that documents being transported by belt drive 53 and roller 54 will be stuffed into the open envelope. The sensor 55 senses proper loading into the envelope. Assuming proper loading, and readiness of the downstream module 19, the gate 49 is open, and the associated pressure roller 56 applies pressure to the envelope against the transport belt 57, causing the envelope to transport to the next module 19.

The stuffed envelope passes to the turner station module 19, the turner module being described in detail in copending application, Ser. No. 279,000, filed Dec. 2, 1988, now U.S. Pat. No. 4,928,807, issued on May 29. 1990, assigned to the assignee of the present invention and incorporated by reference herein. The envelope is transported by transport belt 61, driven by roller 62, under pressure of pivotable pressure roller 63, whereupon it comes to rest against a stop 64. Reject mechanism 65 (not shown), if a reject condition exists, will eject the document in a direction transverse to the document path. Absent a reject condition, the envelope is rotated 90°, from a position wherein the opening of the envelope is transverse to the feed path, to a position where the opening of the envelope is parallel to the feed path, as described in the aforesaid application, Ser. No. 279,000, now U.S. Pat. No. 4,928,807, issued on May 29, 1990. Next, the feed path is raised relative to the document stop 64, as shown in FIG. 2, so that the envelope is free to move, the pressure roller 63 driving same against the belt 61, through pressure roller 66, to the next station 20.

It will be evident that a principal advantage of the invention is the ability to be able to reject an unopened or damaged envelope, allowing multiple attempts at inserting any given collation that is being held in queue.

Because the inserter is an in-line system, an appropriate location to reject the envelope is out of the turn station 19, 90° to the direction of the mailpath, in to a tray 19A (FIG. 1) that would be in close proximity to the operator for manual handling, at a time after the envelope is transported out of the insertion area and positioned against the stops 64 in the turner 19 before the turning cycle is started. This is an appropriate reject point because the envelope is not confined on both sides by transporting or turner mechanisms and it is stationary. The reject mechanism 65 accomplishes the reject function.

Figure 4A:
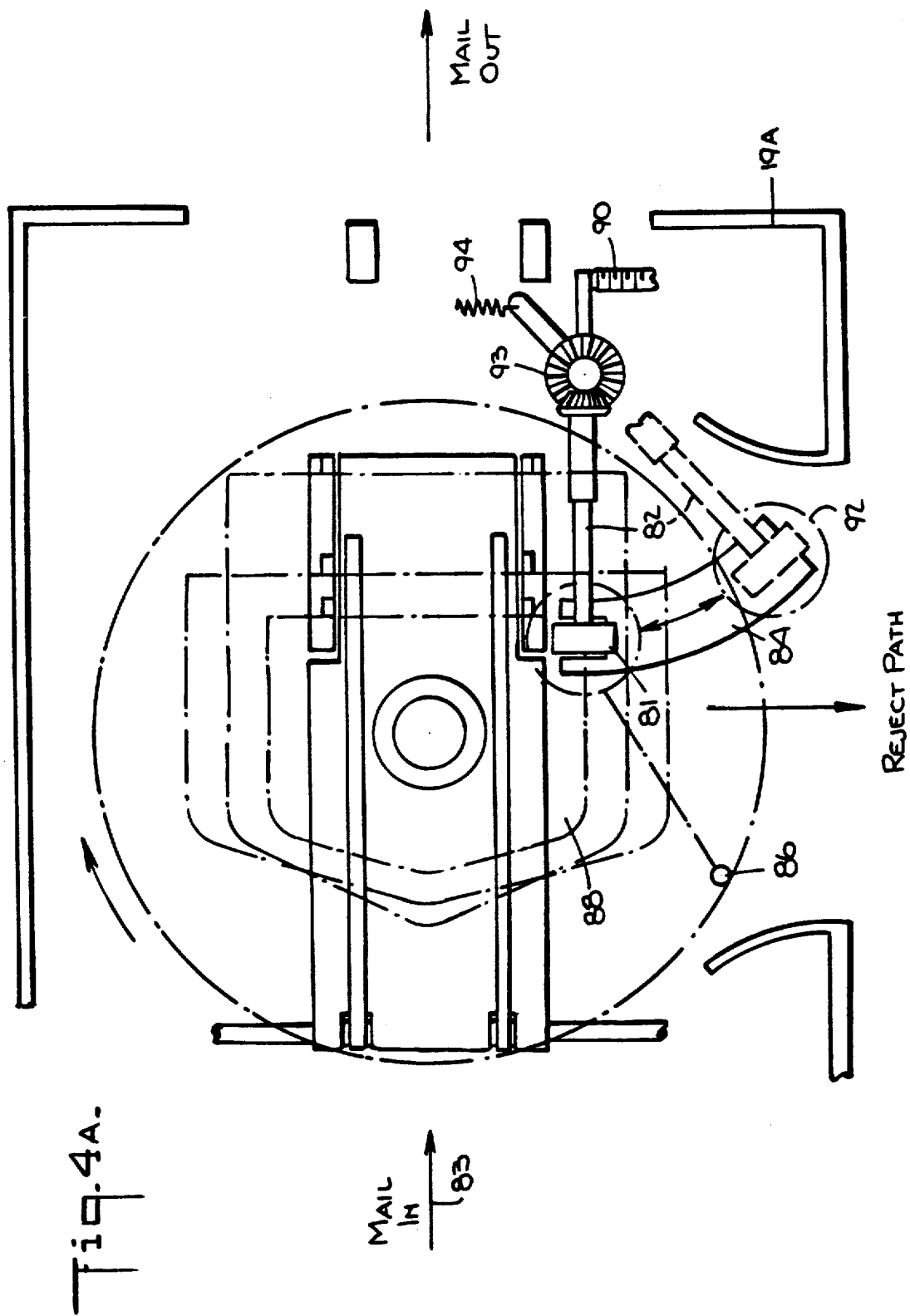
FIGS. 4a and 4b are an illustration of the reject mechanism of FIG. 2.
Figure 4B:
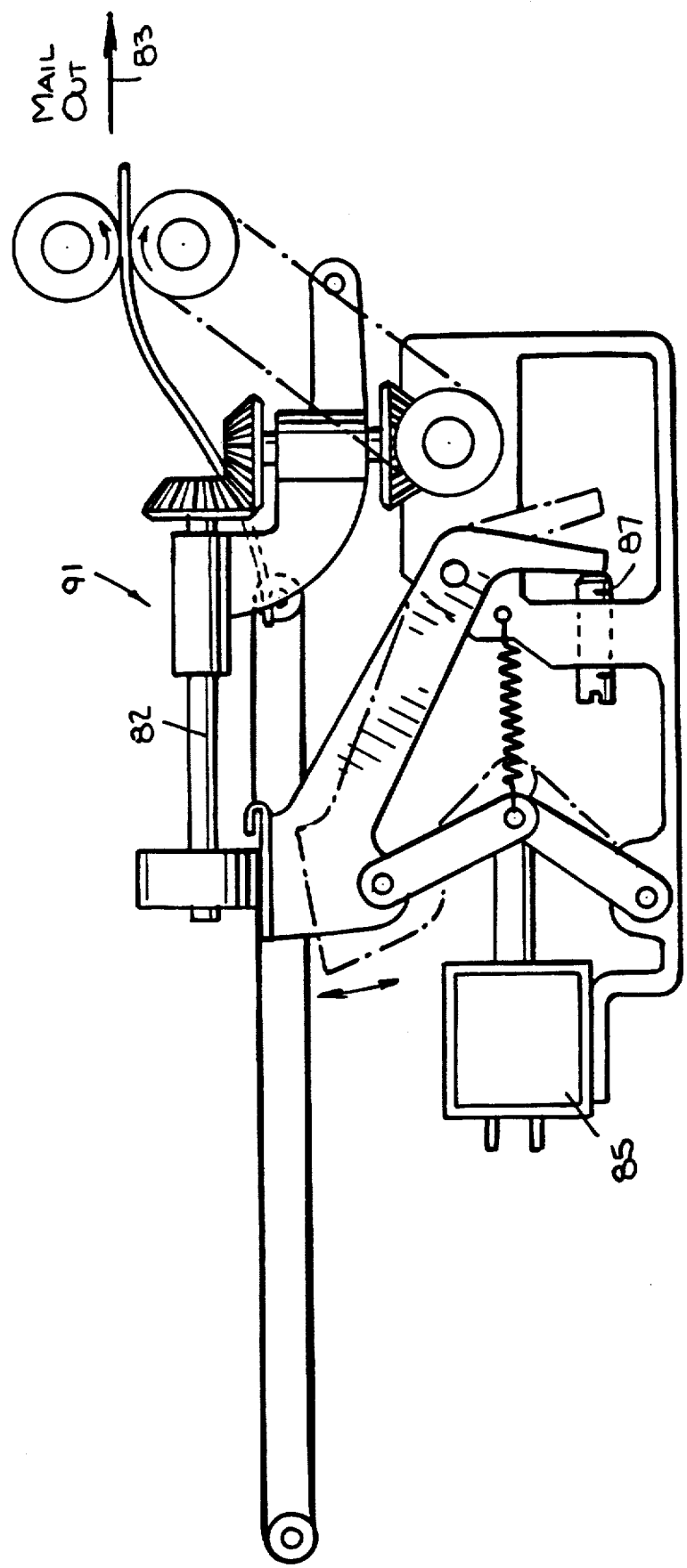

Referring to FIG. 4, the rejection device is made up of a soft, constantly turning roller 81 on a long swinging arm 82 whose home position is out of the mailpath B3. Positioned under this roller is a curved ramp 84 that can move up and down by the action of a solenoid 85. The curve of the deck is such that when the arm swings through its travel, the ramp will always be below the turning roller. One end of this curved deck is under the lower left corner of the smallest envelope 88 that the machine will handle. When it is desired to reject an envelope the solenoid 85 activates lifting the deck until it hits its stop 87 which is adjusted such that the turning roller 81 engages the deck 84 providing the power to swing the arm 82 in the direction of the envelope 88 which is up against the turner reject position 86 and the arm 82 will hit its stop 90. At this time the turning roller grips the envelope 88 and sends it out of the machine 91 into the tray 19A. At this time the solenoid 85 is turned off and the deck 84 drops down allowing the arm 82 to return to its home position 92 driven by the torque of the vertical shaft 93 and the return spring 94. A sensor 95 (not shown) is positioned in an appropriate location to sense the success or failure of a reject operation. Failure can include a reject report operation, which repeats all of the foregoing steps. Failure may include, for example, a dual feed into the turner station, wherein the reject operation removes only the uppermost of the dual feed documents, thus requiring a repeat reject.

Referring again to FIG. 2, in station 20 the stuffed enveloped passes through a flap moistener represented as a wetted wick and reservoir 67, disclosed in greater detail in aforesaid copending application Ser. No. 281,607, now U.S. Pat. No. 5,006,194, issued on Apr. 9, 1991 a flap sealer represented by rollers 68, and then transported by the drive belts 69 shown to storage or sorting facilities, or directly to a postage meter. The usual condition detection input 20A and output 20B sensors for the moistener are present.

The machine operation will be clearer from FIGS. 3a–c, which show document positions during successive time periods. For clarity, the rightmost queuing station will be designated 25A, the previous upstream queuing station 25B, and the leftmost queuing station 25C. FIG. 3a assumes a stack of documents 70, previously referred to as the global collation, which is at a rest position at a queuing station 25C of the upstream feeder 22, with an address document 71 on top (shown smaller for clarity). A controller meanwhile has instructed the next module 12 to feed one document 51 from its hopper to be added to the global collation. So, while the collation 70 waits at its queuing station, one set of the documents 51 is deposited in the local queuing station 25B, shown at FIG. 3b. The sensors having informed the controller that document 51 is present in station 25B, then the controller opens the gate 72 at station 25C and the global collation moves downstream to the next queuing station 25B where it is halted by the gate 26B. The downstream path, indicated by the curved deck 73, is such as to deposit the global collation 70,71 on top of the document 51. This is shown in FIG. 3c. Meanwhile, station 25C having been emptied, can now be filled with the upstream global collation 74, shown with its address document 75 on top. FIG. 3c also shows that the downstream feeder 12 has deposited a document 50 from its hopper onto its queuing station 25A.

The last view shows another snapshot of the system at a subsequent time. The global collation 51, 70, 71 at station 25B has moved downstream to queuing station 25A and placed on top of document 50. Upstream, a document 51 has been deposited at station 25B, and the system is ready to advance global collation 74 75 downstream to station 25B.

An important feature is that each local station operates asynchronously, that is, substantially independently of the other stations, feeding when instructed local documents to its local queuing station, and calling for the upstream global collation to be passed on to it as soon as its local feeding is over. Hence, local deposit of documents at multiple feeders is not synchronized, each feeder doing its own local feeding under control of a local controller. Similarly, global collation movements downstream are not synchronized but are passed on, on demand of and under control of the next downstream controller. Input and output sensors are employed at each module where appropriate. The sensors are constantly sending messages to the local controllers informing them of document arrivals and departures. Each local controller possesses the ability to transmit information to a central controller. Similarly, the transport and feed mechanisms are similarly activated as needed and in an asynchronous manner. Although not shown, multiple sensors may be employed along each belt at each station to ensure bilateral symmetry of movement (absence of skew) along the mail path.

The operation of the envelope stuffing, turning moistening and sealer stations is similar. The envelope stuffer will not call for the global collation at 25A until an envelope is positioned, opened and ready for stuffing. Similarly, no stuffed envelopes will feed downstream until the turner moistener and sealer are ready to receive it. Additional module operations such as bursters, scanners, postage meters sorters and stackers, whether upstream or downstream may be employed in this system, with similar sensor arrangements, local controllers and queuing.

Figure 5:
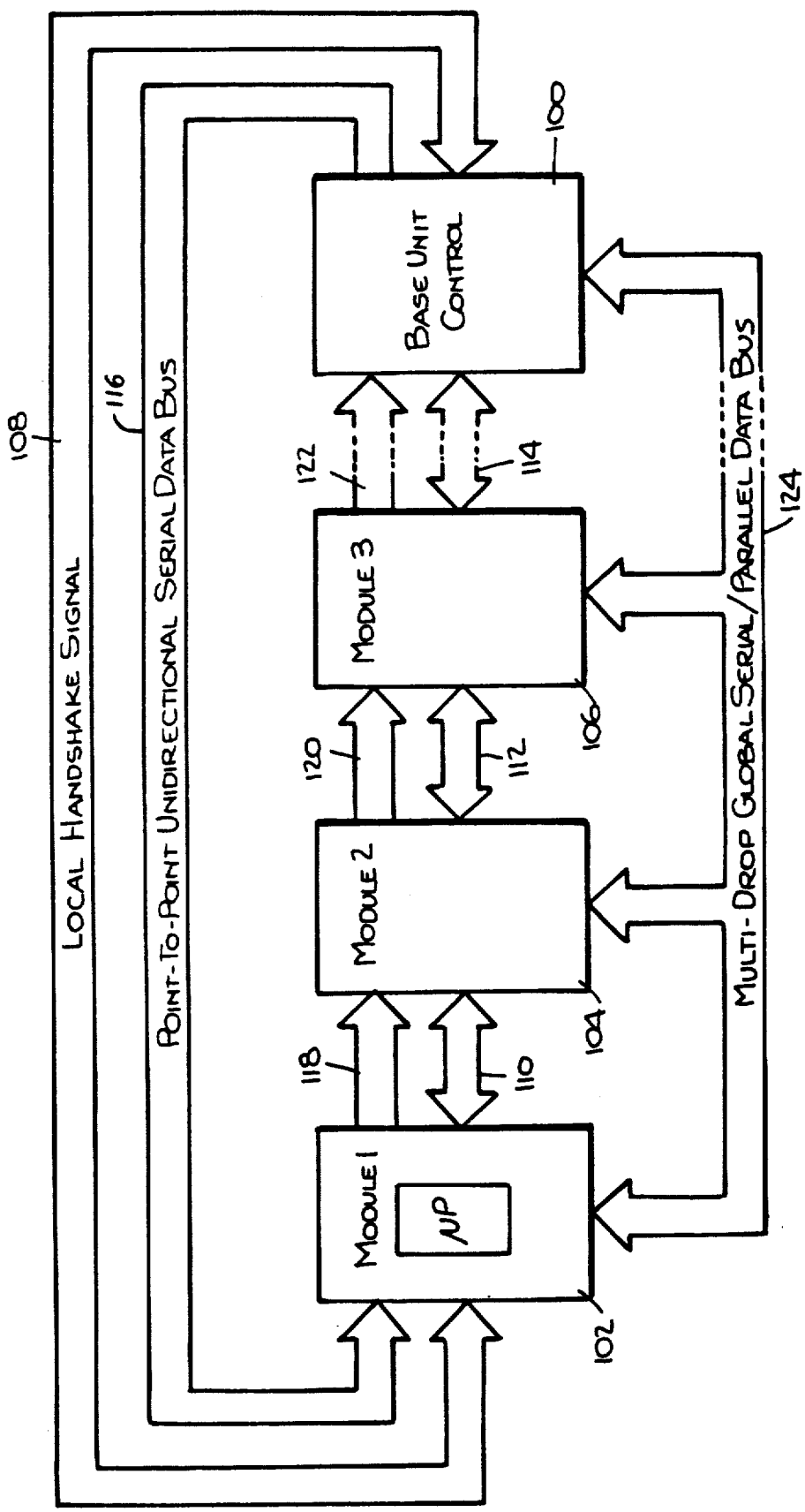
FIG. 5 is a block diagram of the interrelating electronics system for operating the apparatus of FIG. 1.

A schematic of a system block diagram in accordance with the invention is given in FIG. 5.

The overall communication concept employed herein is a unique communication arrangement of combining command/response and peer to peer communications. Peer to peer communication is also termed piece record transfer. When the system is not running the communication is a command/respond, master/-slave communication arrangement. This is a one-to-one command response protocol where the master controller, here the base envelope feeder microprocessor, retains command and control over the various inserter module microprocessors. However, while the system is running, the communication technique changes to a piece record transfer mode. Master slave communication is precluded during this mode of operation. If there is a need to communicate between modules (not a jam requiring user intervention) such communication is transparent to the user. This allows the use of a single UART for dual purpose communications and allows the throughput of large volumes of information because the processing is in parallel in each module and the data transfer throughout the modules are concurrent.

The system also provides for automatic configuration of equipment on power up, and generates (each time it powers up) the necessary operating configuration information of the equipment. The ring of topology of the present invention facilitates a geographic addressing mode. The system configuration analysis command initiated by the master controller during the power up sequence requires each module in the inserter to identify itself, serially, by tagging an address onto the command initiated by the base control unit and to pass the tagged data back to the master controller. Because of this arrangement, the system knows the number of modules and each module address. It does not, however, have to know the particular nature of the modules, i.e., feeder, burster, etc. This allows for the addition of new and yet unknown modules to the system.

In the running mode, a serial topology is employed. Thus, the electronics in each module allow for generation of a piece record in software regarding each collation. A piece record is generated by the electronics and is passed from module to module asynchronously along the serial data link from one module microprocessor to the next. The piece record corresponds to a physical collation of the document set which is being moved from module to module. It represents an image of the physical collation. Because of this architecture, one can pass a relatively large amount of data in block format from module to module. The piece record is a dynamic data structure and accommodates different size in different runs. The piece record data is in a sequenced arrangement and is passed between the modules in accordance with the communication protocol, and not necessarily synchronously with the physical movement of the documents. The piece record can include data for running a printer and/or any currently unknown or new I/O device. Also, communication continues between modules on a local level, including local handshake factors for release of queued documents.

The software architecture is such that all messaging is displayed on the base or envelope module (all inserter configurations have an envelope module). Because all messages that are displayed on the base are generated by the various inserter modules and transmitted to the base module microprocessor for display on the display (in any language the operator selects) the system is flexible and allows the addition of new modules that do not presently exist. This permits module additions without having to change any of the existing software. Modules such as bursters bar code readers, OCR readers, scanners, sorting devices, postage meters, printers etc., can be easily added, both upstream or downstream from the master controller.

The communication system of the present invention will now be set forth with greater detail in connection with FIG. 5. As shown in FIG. 5, the electronics controlling the base unit, that is to say all portions of the inserter shown in FIG. 1 with the exception of the add-on modules designated generally as 12, is designated as block 100. The electronics for each individual module 12, designated as modules 1, 2 and 3 for purposes of illustration, correspond to elements 102, 104 an 106. It would be understood that additional modules may be added, the dash lines between module 106 and base unit control 100 representative of such additional module insertion. The electronic interconnection between the base unit control 100 and the module is set forth on a dual basis. First, local handshake signals are provided from base unit control 100 along the local handshake data line 108 to and bus 114 to additional modules and ultimately to the base unit control 100. The function of the local handshake signal data bus is to interconnect specific interunit communication signals in accordance with the operation of the device. Thus, the lines are shown as bi-directional, with the capability of exchanging information as required between the respective microprocessors contained within each of the units, 100, 102, 104 and 106. The base unit control 100 is further connected along data line 116 for point to point unidirectional serial data flow to the module 102. The module 102 is coupled to the module 104 along the unidirectional serial bus 118, module 104 coupled to module 106 along the unidirectional serial data bus 120, and the module 106 coupled to the base unit control 100, through any intermediate module in the same manner, along unidirectional data bus 122. A second level of communication is provided between the base unit control 100 and each of the respective modules along the multi drop global serial-parallel data bus 124. This data bus is also bidirectional and serves the function of a direct means of communication between each of the modules and the base unit control. Thus, two levels of data communication are illustrated, first providing for serial information exchange from the base unit control through each of the respective modules, and a second level of communication providing for direct communication between the base unit control 100 and each of the respective modules 102, 104, and 106. The purpose of dual level communications is to maximize the speed of information exchange and thus to maximize the speed of the operation of the insertion operation.

Figure 6:
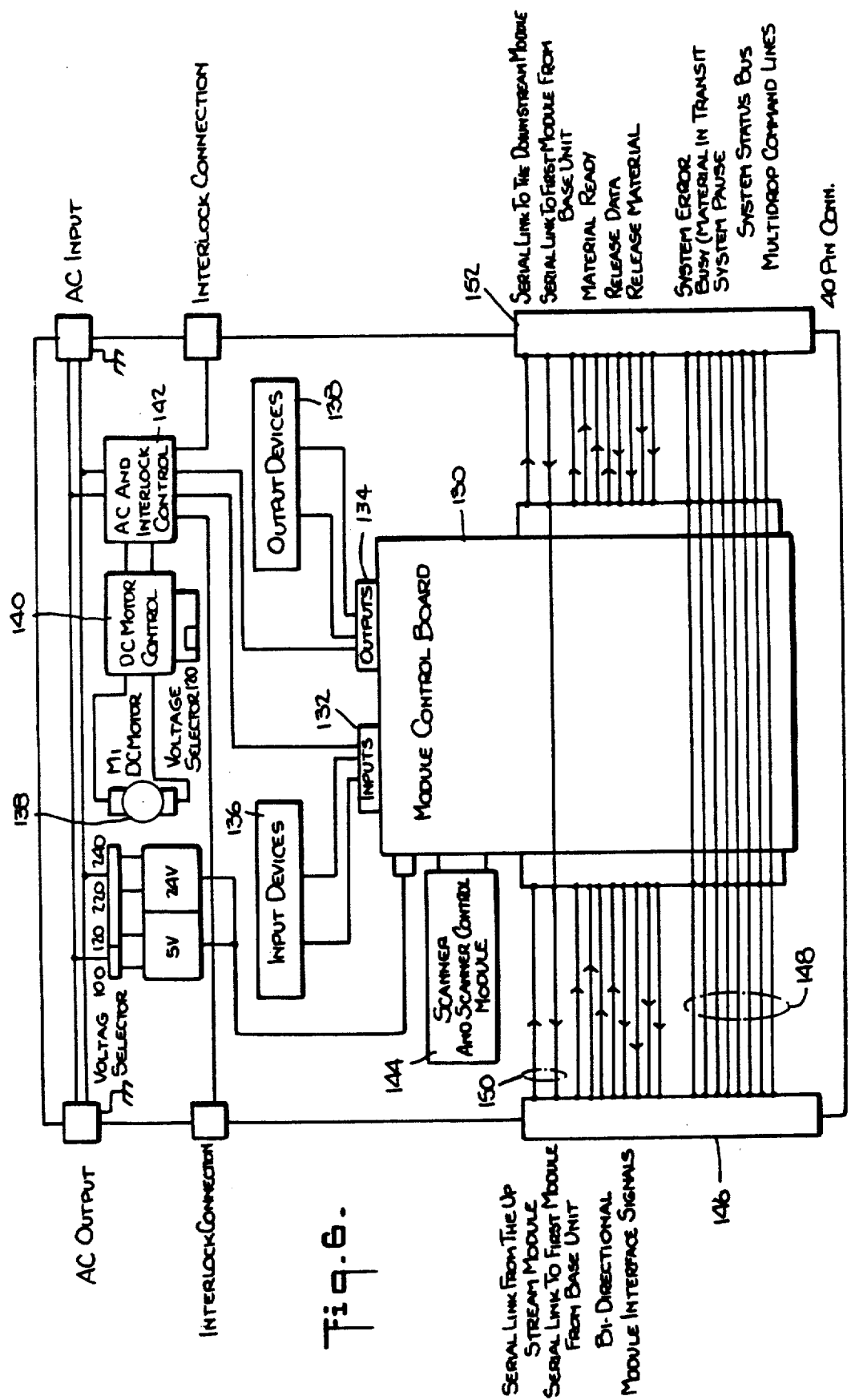
FIG. 6 is a block diagram of the electronics of a single module.

Referring now to FIG. 6, a generalized diagram of each individual module illustrating the relative relationship between respective components in such modules is shown. As indicated therein, the basic electronics for each individual module is contained within a module control board 130 which has respective input port 132 and output port 134 to input devices 136 and output devices 138. Input devices will include the various document position sensors indicated hereinabove with respect to the explanation of the FIGS. 1 and 2, as well as local switch settings and the like. The output devices will include various solenoids and relays, and display devices, and also as illustrated hereinabove. In addition, the control board will drive respective power sources, including the motor drive indicated generally as 138, driven by DC motor control 140 under the control of an AC interlock control unit 142. The motor 138 corresponds to motor drive 28 shown schematically in FIG. 2. Informational input to each individual module may be provided by means of a scanner and scanner control module 144 which may consist of a conventional optical scanner or the like, suitable for inputting information from a document, such as the document 71 illustrated in conjunction with the explanation set forth in FIGS. 3A-D or other input means derived for the purposes of inputting feeding information with respect to a document stack contained by the respective module.

As shown in FIG. 5, each of the various modules has means for passing information relative to preceding modules there through. Thus, as shown in the module electronics schematic of FIG. 6, bi-directional module interface signals corresponding to lines 110, 112, 114 of FIG. 5 are provided into a terminal block 146 along pluralities of data line 148. The point to point unidirectional serial data bus 116 illustrated in FIG. 5 is shown generally along the data lines 150. Outputs from the module are provided through the upper terminal 152, and include the serial links between each of the modules, the serial link to the first module from the base unit, the multi drop command line port coupled to the multi drop global serial-parallel data bus 124, illustrated in FIG. 5, and other bi-directional module interface signals required for hand shaking mode and the like.

Figure 7:
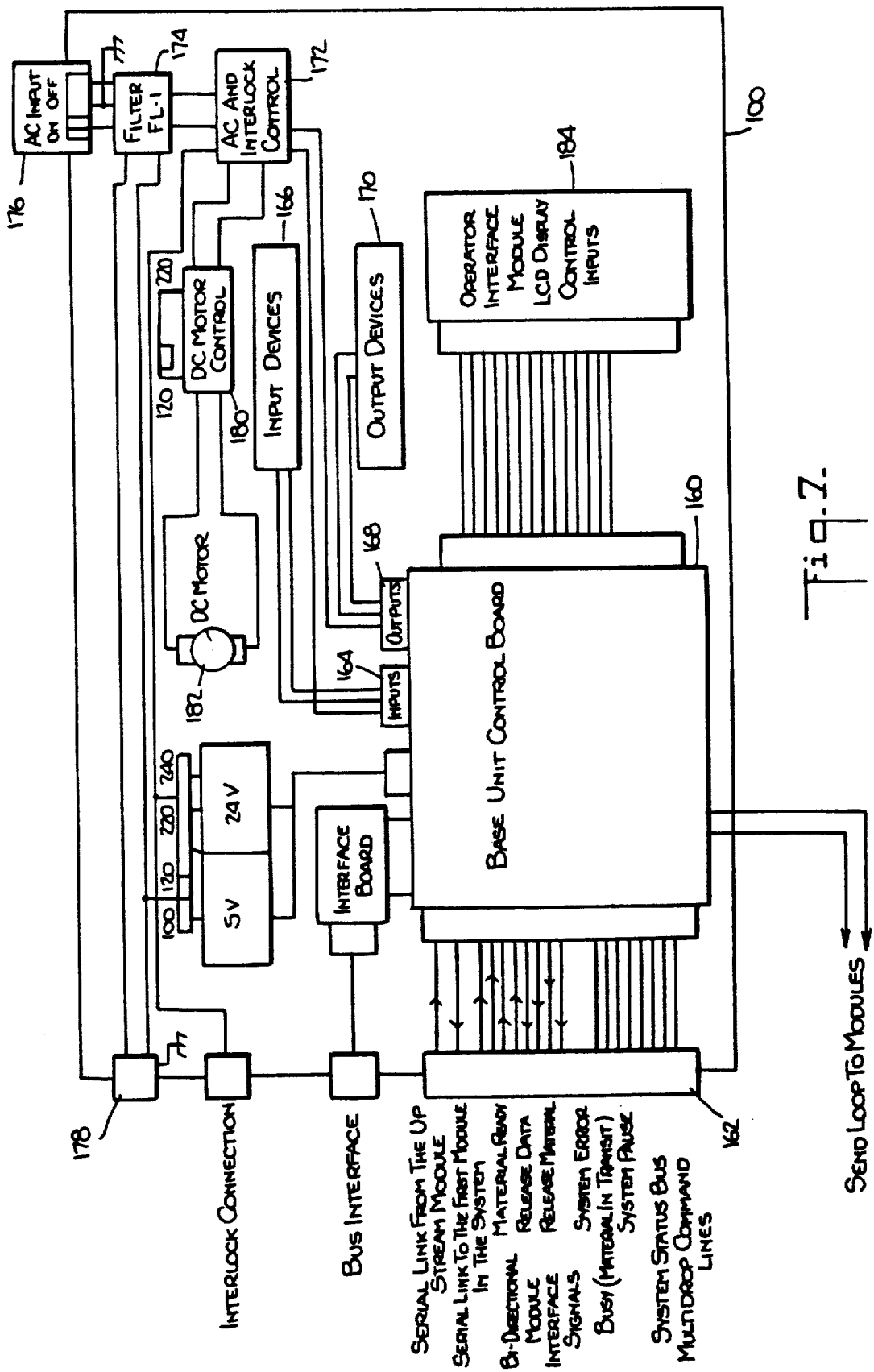
FIG. 7 is a block diagram of the electronics of the base unit.

Referring to FIG. 7, a more detail ed illustration of the functional relationship of the elements contained within the base unit control 100 is illustrated. As illustrated in FIG. 7, the base unit control electronics includes a computerized base unit control board 160 containing a plurality of input and output data lines, coupled through port 162. These data lines include the serial link from the upstream module, the serial link to the first module in the system, the bi-directional module interface signals, the system status bus and the multi drop command lines, among others. The base unit control electronics 160 further includes input port 164 and output port 168. The input port 164 is coupled to a series of input devices 166, which include the plurality of sensors positioned throughout the various areas of the base unit module, as shown in FIG. 2. The output terminal port 168 is coupled to a plurality of output devices 170, which may include inter-active mechanical components such as the turning station and reject station noted in conjunction with FIGS. 2 and 4. In addition, the control board 160 is also coupled to AC and interlock control 172, which is in turn coupled to a filter 174 for receiving the AC power from input 176, and provides filtered AC to the AC output terminal 178 for powering the modules. The AC and interlock control 172 is also coupled to the motor control circuit 180 which in turn supplied regulated DC current to the DC motor 182 which is employed for driving the transport mechanisms and belt drivers illustrated in conjunction with the explanation set forth above in FIG. 2. Input and output ports 164 and 168 are also coupled to the motor control circuitry for communicating signals relative to the control of this motor. The operator interface module 184 is coupled to output of the electronic control board 160 for providing a interface between the keyboard 16 and display screen 15 in the electronics control station 14 illustrated in conjunction with FIG. 1.

Figure 8:
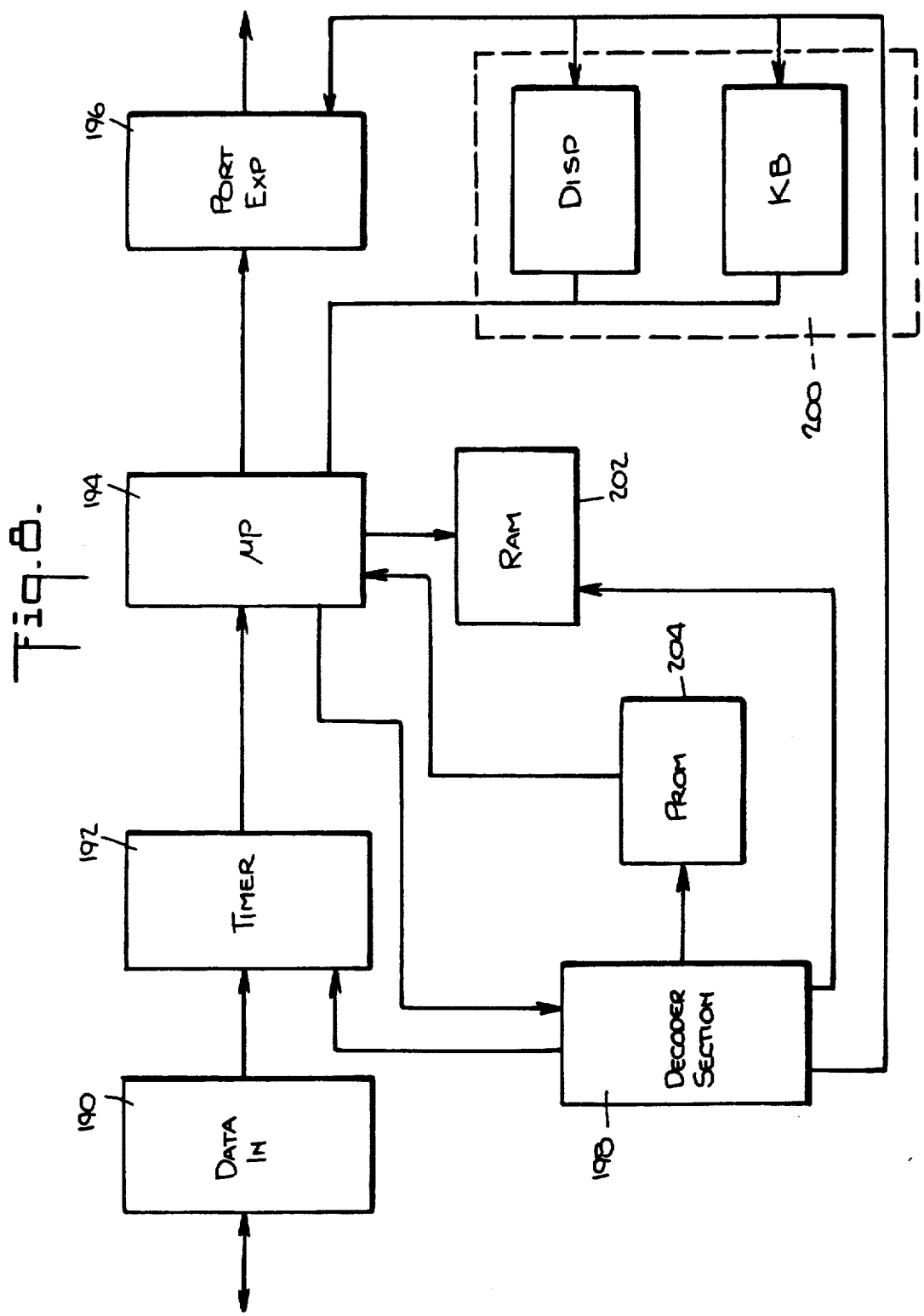
FIG. 8 is a block diagram of the microprocessor employed within a single module.

In reference to FIG. 8, a detailed description of the computer control of the base unit control board 160 is illustrated. The data link is provided through input data port 190, and through timer 192 to the microprocessor 194 which is typically of the intel 8051 family of microprocessors. A port expander 196, which may be an Intel type 82C55 receives output signals from the microprocessor 194 and places these output signals into various data lines for inter connection to the respective remote modules. The decoder section 198 responds to signals received from the microprocessor 194 for interfacing with the timer 192, and the keyboard and display unit illustrated generally as unit 200. The microprocessor 194 operates in conjunction with random access memory 202 for temporary data storage and a permanent read only memory 204 for supplying the program control in the microprocessor 194.

Figure 9:
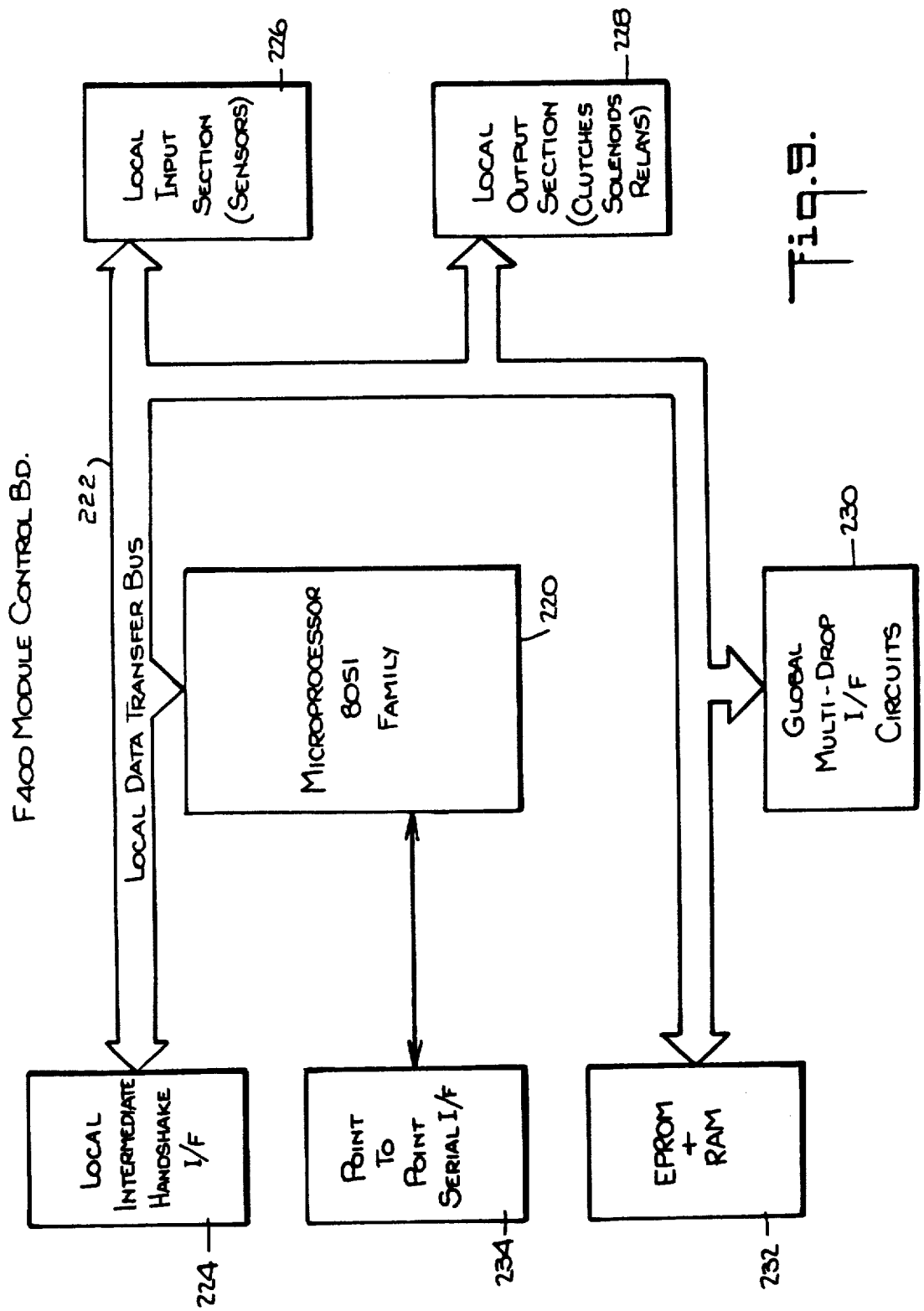
FIG. 9 is a block diagram of the microprocessor employed within a base unit.

Referring now to FIG. 9, a more detailed diagram of the module control board 130 of FIG. 6 is illustrated. Each individual module is controlled by a local controller, such as the microprocessor 220, which is preferably of the Intel 8051 family, coupled to a local data transfer bus 222 receiving local intermodule handshake signals through the local module handshake interface buffer 224. Local data transfer bus 222 also receives signals from the local input section 226 which includes the document position sensors illustrated in conjunction with the explanation set forth in FIG. 2, local keyboard input, and other input devices. The data transfer bus also provides output signals from the microprocessor 220 to the local output section 228 for controlling electromechanical components contained within the module such as motion clutches for driving the transports, solenoids for disabling the drive motors and activating the queuing stations, and relays for activating status lights and other power functions. As set forth above in conjunction with the explanation of the operation of FIG. 2, the data transfer bus 222 also carries signals to the buffer 230 for the global multi drop interface bus 124 (FIG. 5). Block 232 includes EPROM for program storage for local program control and RAM for temporary storage are also coupled to the microprocessor local data transport bus 222 in a conventional manner. Microprocessor 220 also receives the signals derived from the point to point serial interface bus through buffer 234.

With reference now to the block diagram of FIG. 10, the software routines utilized to establish operation of the electronic control system of the inserter of the present invention will be described.

The system provides for automatic configuration of equipment on power up, and generates (each time it powers up) the necessary operating configuration information of the equipment. Prior art systems require a configuration PROM installed in the equipment. For each configuration change, a new configuration PROM had to be generated and physically changed. It should be noted that such equipment allowed the user to selected features within the configuration, but not to change the configuration itself The system employs a master controller operating in conjunction with the module computer. The ring of topology of the present invention facilitates geographic addressing for module identification. The system configuration analysis command promulgated by the base unit micro-processor during the power up sequence requires each module in the inserter to send data back. Because of this arrangement, the base unit microprocessor will have stored therein the number of modules and the address of each. It does not, however, need to know the particular nature of the modules. This allows for the addition of new and yet unknown modules to the system. The software architecture is such that all messaging is displayed on the base module (all inserter configurations have an envelope module). Because all messages that are displayed on the base are generated by the various inserter modules and transmitted to the base module microprocessor for display on a display screen (in any language the operator selects) the system is flexible and allows the addition of new modules that do not presently exist. This permits module additions without having to change any of the existing software. Modules such as bar code readers, OCR readers, scanners, sorting devices, etc., can be easily added.

Referring again to FIG. 5, the present invention accomplishes this purpose by utilization of the uni-directional serial data busline 116, in which the base unit addresses all modules serially using a global system command sent on the serial channel. Geographically speaking, the control signal is sent to the furthest module first. The base unit maintains a table of addresses of each of the modules in the system. Thus, conceptually, the base unit initiates a control signal by a command which is sent to module 1, and module 1 applies as a tag to the command signal a local address indicating its presence and, if desired; its configuration. The tagged command signal passes along the serial data bus 118 to module 2, wherein module 2 adds its address and configuration to the data and so on through module 3 and the remaining modules until it returns to the base control unit wherein it is stored in memory.

Figure 10:
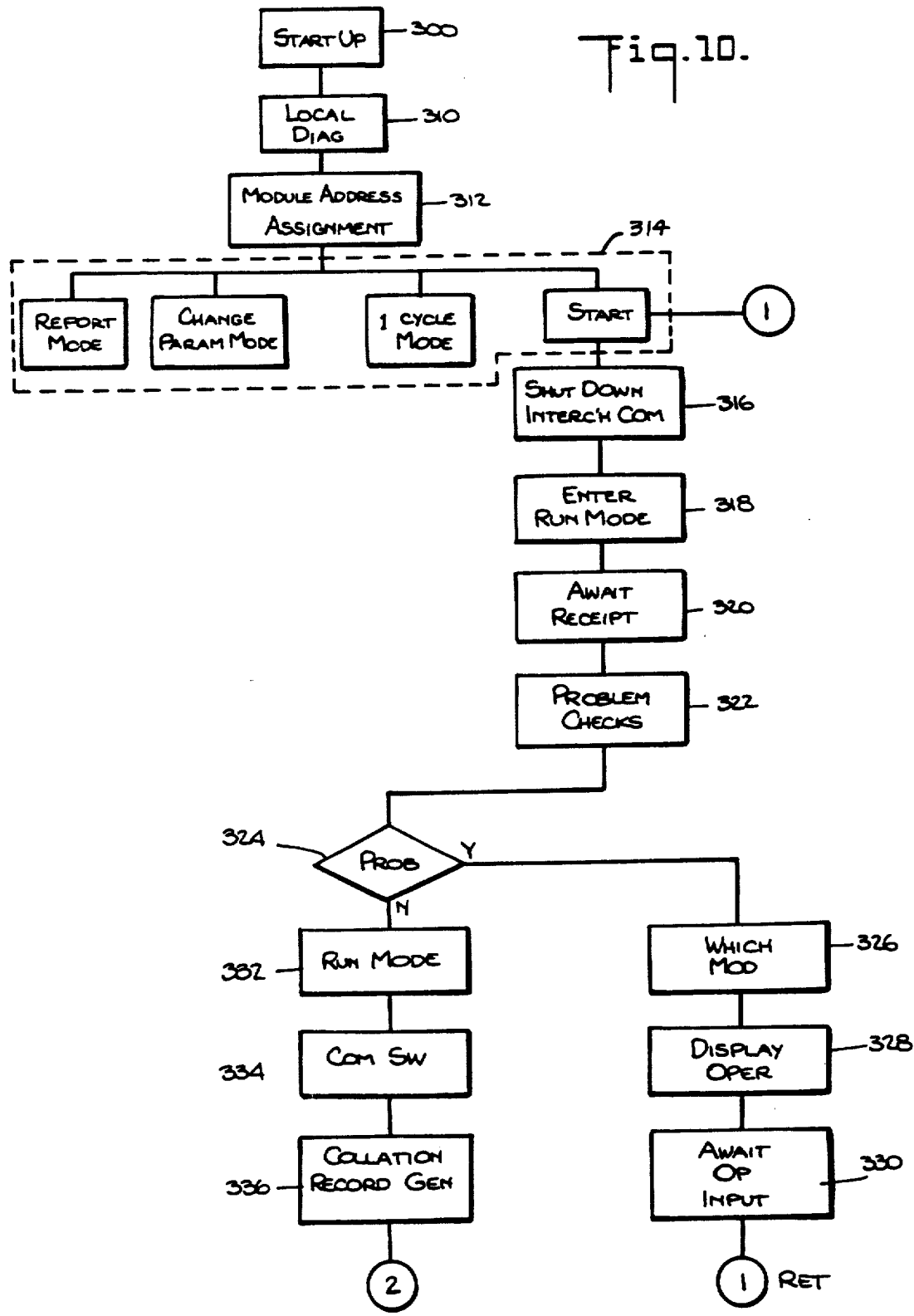
FIG. 10 is a flow chart illustrating the program routine and system flow within the base unit.

Referring now to FIG. 10, the program routine for the base module provides first for the initiation of the startup routine from the central unit, in block 300. The next step in block 310 is the performance of local diagnostics within the base control unit. Next, block 312, a module address assignment is initiated by passage of a geographic address command along the serial data bus. The modules respond, as described above, by placing an address and, if desired, type designation code or tag on the command signal, and passing same onto the next module, and so on, until the signal returns to the base unit wherein it is stored in memory. Thereafter, in block 314, the system branches in accordance with the optional selections made by the operator regarding the modes in which the inserter may operate. These modes include START, SINGLE CYCLE, SET UP TO CHANGE PARAMETER MODE or REPORT MODE. Options are displayed on the local screen, and the operator chooses by keyboard inputting a choice. The remaining options in block 314 are SINGLE CYCLE, SET UP TO CHANGE PARAMETERS and REPORT MODE. In SINGE CYCLE, the program runs through only one insert operation and stops. In SET UP TO CHANGE PARAMETERS the communication protocol creates a window into each module once the base unit becomes a terminal which allows the operator to communicate directly with each module. The REPORT and DIAGNOSTIC (a separate mode not accessible from the screen) modes operate similarly, i.e., by command/response communication. If the operator chooses the start mode, the operation proceeds to block 316 wherein the first stage of the operation is to shut down the interchannel communication represented in FIG. 5 by communication between blocks 102 and 104, 104 and 106, etc. The program next enters block 318 and begins the run mode. In the run mode, the base unit sends out a global command on the serial channel that tells each individual module to enter a run mode, in response to which each module prepares for a document transfer to process paper. Once entering the run mode, the base unit awaits the receipt through each module along the serial channel of the signal indicating each module has effected run mode transfer operation. This occurs in block 320. Upon receipt by the base unit control of a confirmation signal through each of the successive modules, the signal is examined, block 322, to determine whether or not there are any problem checks, that is to say, whether any problems have occurred in each of the individual modules. Since each module has a unique channel address, a problem occurring in each of any individual modules will manifest itself by modules own identification address in the base unit control system. As indicated in decision block 324, any problems that are determined to have occurred will cause the system flow to proceed to block 326, where it is then determined which module has a particular problem. Through the message capability of the base unit, problems that occur in any individual module are specifically identified and displayed to the operator, block 328, in the base unit control electronics display 15, see FIG. 1. In block 330, operator input is awaited for purposes of correcting any specific problem which may have been displayed upon the display screen as a result of the analysis of block 322. Upon confirmation of the operator of correction of the problem, the cycle begins again as indicated by the legend "1" in a circle, corresponding with the circled 1 in the start block of 314, and repeats itself. Assuming the absence of a problem in the first or successive cycles, decision block 324 indicting same in the NO direction, then directs the flow to enter the run mode step 332. After entering run mode, the system transfers its operation, block 334, from a command-response, master-slave communication arrangement, which is a one-to-one command protocol where the master unit retains command and control over the various inserter module microprocessors, to a piece record transfer mode. The electronics in each module allow for generation of a piece record, also termed collation record, in software regarding each collation. A piece record is generated by the electronics and is passed from module to module, without passing through a master controller, asynchronously through the inserter, from one microprocessor to another. The piece record corresponds to the physical collation which is being moved from module to module. It represents an image of the physical collation. Because of this architecture, one can pass a large amount of data in block format from module to module. The piece record is a dynamic data structure and accommodates different sizes of collations in different runs. The piece record is passed in a sequenced arrangement, module to module, but not necessarily passed between the modules synchronously with the physical movement of the documents. Since the piece record is dynamic, it can include data for running a printer and/or any currently unknown or new I/O device. The beginning of the collation record generation, block 336, results in all communications between modules being done in a manner which is transparent to the base unit control, and not along the serial data channel. Handshaking communications take place along the communication links 110, 112, 114, and piece record transfer along the links 118, 120 and 122 (FIG. 5). Errors requiring operator intervention are transmitted to the base control unit by means of the multidrop global serial parallel databus 124, by which background mode communication is maintained between the base unit control 100 and each of the respective modules. Thus, transfer of a large volume information is possible because processing is in parallel and each module and data transfer takes place in a concurrent manner.

Referring 10 FIGS. 11A & 11B, a module flow routine is shown. The piece record generate command block 336 begins the module flow routine. The piece record, also termed collation record, represents all of the particular data associated with a particular run through an individual feeding module. The first step in the generation of the collation record is the activation of the motor drive in the first feed module, block 338. In block 340, the module then scans for the control signal for data which is to control the operation of the individual feeder. This data may include a number of specific documents for a run, the number of individual documents which may be included from that specific feeder, particular documents which will be required for an insert operation, and, in the case of downstream modules, information regarding the receipt of specific information from upstream modules. This data may be provided from a control document, read optically or by bar code, or input on the module keyboard, may be transmitted from the base unit control, or may be sent as part of a data link communication from a remote source. The three options are illustrated as side paths, block 342.

It is also possible for multiple instructions to be issued in each module. Thus, for example module 1 could contain a multipart invoice with instructions on collation, module 2 could contain a check corresponding to the invoice with its own instruction. In block 344, the operation is commenced. Upon completion of the operation, a complete record, block 346, formed in memory in the microprocessor circuitry of the feed module is created. The piece record is handed off from module to module when the current module has completed its collation operation. However, release of the queuing station and passing the collation onto the next module, will only occur when the down stream module signals it is ready to accept same. Thus, the piece record transfer is not necessarily synchronous with the collation movement. In block 350, the piece record is handed off to the next module, along the the point-to-point bidirectional serial data bus 118. At the same time, a ready signal, indicating that module 1 has its documents in queue, ready to send, is passed block 348, to module 2, the next downstream module. The next module processor M2 repeats the same routine, FIG. 11B, as M1, with corresponding operation blocks shown with the same reference numbers but with "A" suffixes. When M2 has completed its collation operation, and has its documents ready at its queuing station, it acknowledges same, block 348A by providing its ready signal back along the bidirectional link 110 to the first module processor. At this point, block 349, the first module processor M1 releases its queuing station and the first module collation passes to the second module queuing station where it is combined with the second module collation. See FIG. 3a-d. Meanwhile, a similar operation has occurred at the next downstream module, if any. It is noted that the piece record, that is the data status which defines the collation of the first module, has been forwarded to the next module when the collation has been achieved at the first module, along the serial data link 118. This operation is part of the handshaking mode. Thus, the piece record is not necessarily synchronous with the actual passage of the physical collation from module to module. This multi-level communication decreases the processing time of the present invention.

Each module includes a switch on its key panel for enabling on line, off line and automatic. If, for example, the module is on line and the switch is set for two there are then two documents in each cycle for each piece. There are two reading operations in the module. First, the instructions on the incoming document are checked to see if there are any specific instructions. If the module is off line, the incoming piece document, which provides the collation instruction to the module, is ignored. If the module is on line, application are defined either by the input document, by the local hardware where set up was done on the local keyboard, or its input buffer if there was a set-up instruction passed through by the base unit.

In the change parameter mode, where the base unit acts as a terminal for the local module, communication is set up along the serial data link. The module is addressed by the base unit, in accordance with the tag signal placed thereon, as explained in the start up mode. Hence, through the base unit keyboard, the local module can be programmed for an operation, and those instructions stored in the input buffer.

Figure 12:
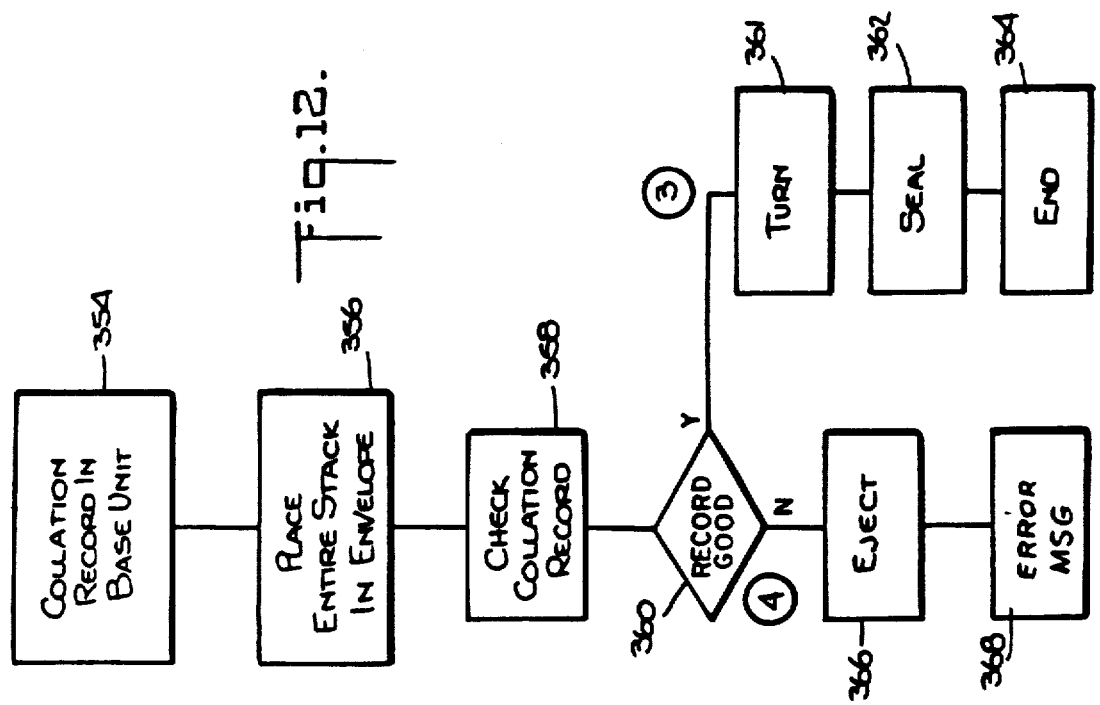
FIG. 12 is a continuation of the program routine within the base unit.

The collation or piece record is incremented by the information added in module 2, and passed on to the next module. This operation continues through each of the individual modules, shown by the dash line 352, until the collation record is received and placed into the base unit, block 354. It will be understood that program steps shown in FIGS. 11A and 11B are all program instructions taking place within each individual module. Base unit flow chart, which ended at block 334, then resumes at block 354 (FIG. 12) when the collation record is received in the base unit. At this time, block 356, the base unit causes the insert operation to take place, as was described in conjunction with FIG. 2. At this point the base module checks the collation record in block 358 to determine if any specific errors have been sensed at any stage or step in the insertion process. The several error checking routines will be described in further detail hereinafter, however each complete collation record provides an overall status for reject conditions. If the collation records indicate that a good run has taken place, decision block 360 sends the program to the turning step in block 361, FIG. 12, then to sealing, in block 362, and ends the operation in block 364. If the collation decision, block 360, indicates a bad collation record, caused for example by overweight insertions, then, block 364, a rejection step takes place in block 366, energizing the ejection solenoid (FIG. 4) and the program sends the transmission of an appropriate error message in block 368.

Figure 13:
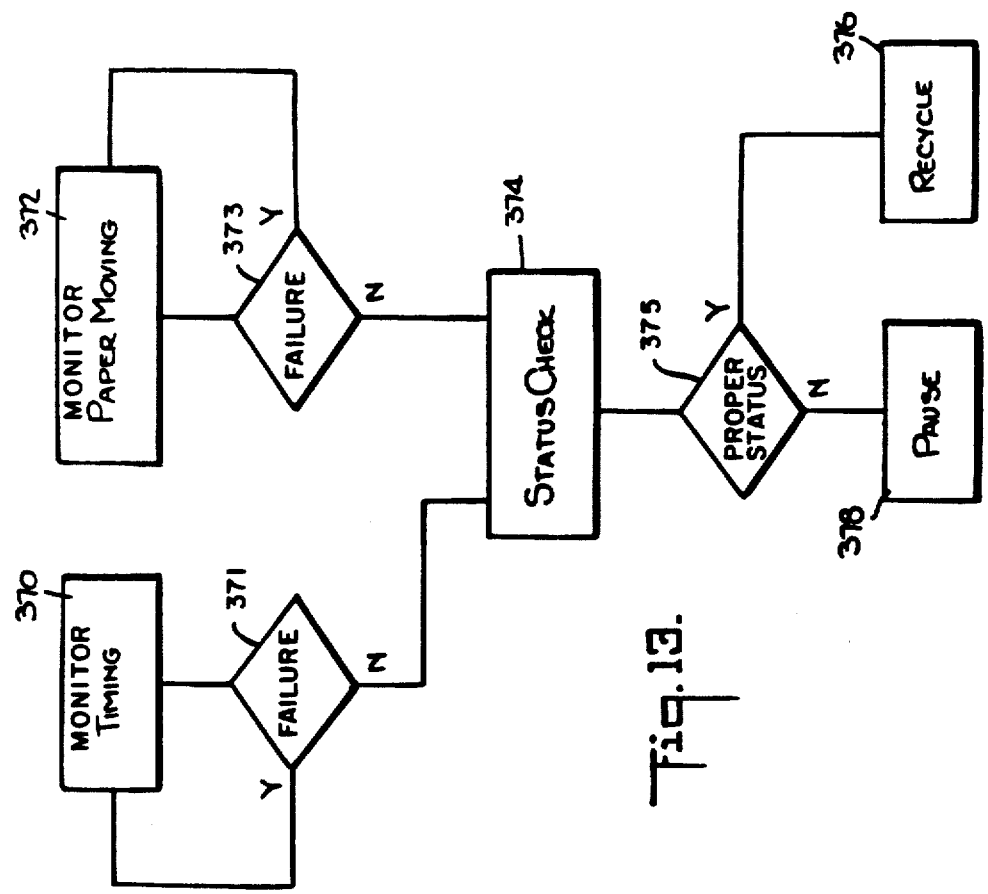
FIG. 13 is a supplemental flow routine.

Referring to FIG. 13, a subroutine in each module monitors error operation. Thus, timing block 370, and paper moving block 372 conditions, as examples, are continually monitored. Failure, N condition, forces a status check, block 74, wherein a Y indicates such condition is proper and the system recycles, block 376. An N condition causes a system pause, block 378, explained in further detail below.

Figure 14:
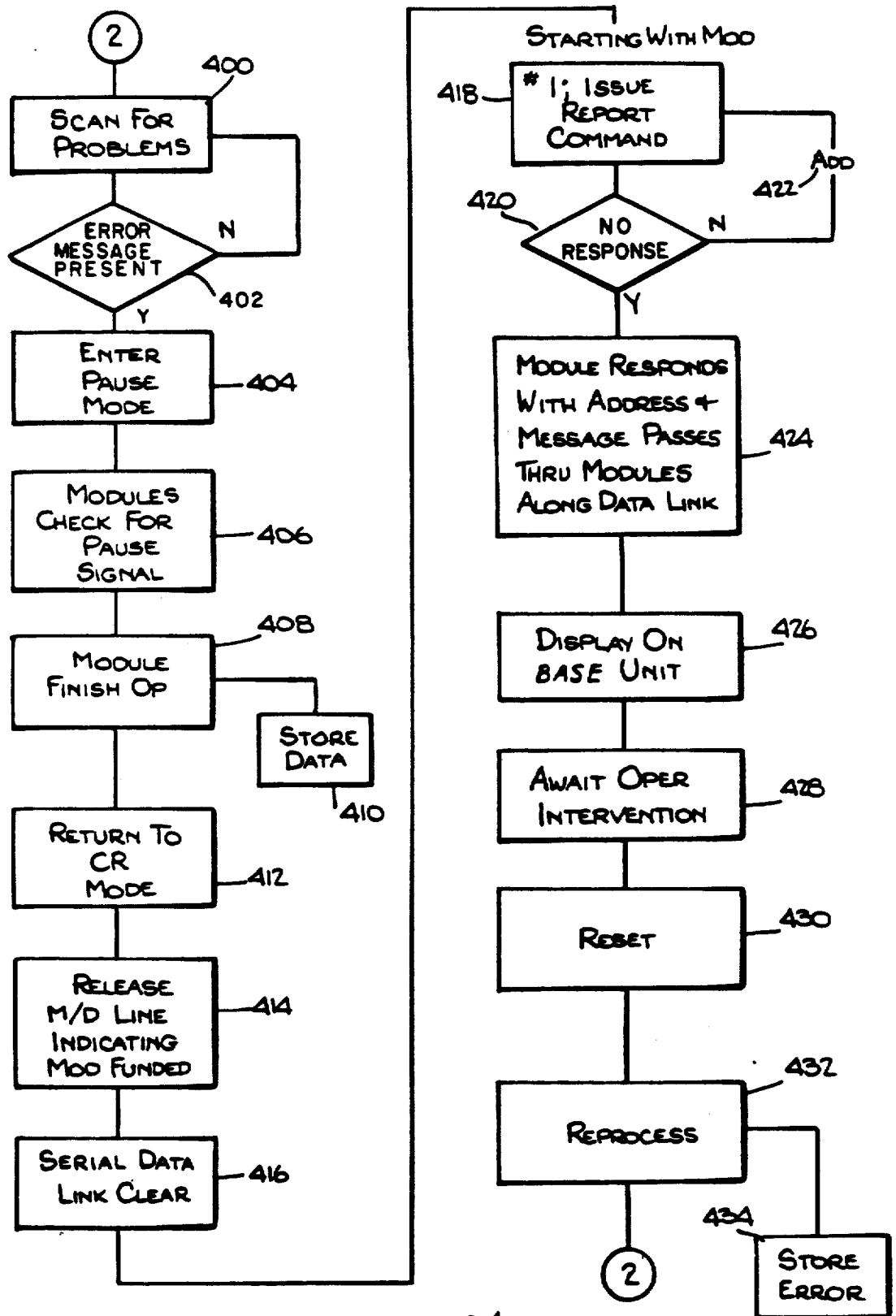
FIG. 14 is a flow chart illustrating the messaging subroutine.

Referring to FIG. 14, the error routines and messaging concept employed in conjunction with the present invention is illustrated. Thus, as shown herein, the first stage of the program in block 400 is a scan routine. The scan routine is continuous and operates throughout the entire operation of every insertion run. During the scan routine, the base unit control 100, along the multidrop global serial parallel databus 124, interrogates each of the respective modules 102, 104, 106 . . . The base unit scans each respective module for conditions which will continuously report machine status and does so along the multidrop global serial parallel interface bus 124, illustrated by an arrow line interconnecting each of the modules to the base unit. Thus, the base unit scans for problems, block 400, and a decision block 402 detects presence or absence of error messages. In the absence of an error message, the scan cycle simply continues again, indicated by the N, or No line emerging from the decision block 402. In the event a problem does occur, the base unit enters a pause mode, and produces a pause mode signal at block 404, and an error message is generated. Messaging is handled so that each module has the entire text of an error message contained within itself. Each time a module error is signalled, the base unit simply displays the error message from each module upon receipt thereof, each module being individually identified as explained and above in conjunction with the start up process by a unique address placed upon each module in the initial scan routine. The initiating of an error message may be prompted by a series of specific error indications, such as out of paper, paper jam, improper movement of a document and the like, indicated in the explanation of FIG. 2. The error line may be driven by any module, and consists of a read-write line which the base unit samples at regular intervals. Each of the modules continually checks for a pause signal, block 406. In the event a pause signal is present, each module begins a shutdown, block 408, wherein a module operation in progress is completed. Module operation is frozen at the end of any specific operation convenient for completion and data stored for later restart, block 410. Stated simply, the error line is driven by the modules and read by the base unit. The pause line is driven by the base unit and read by the modules. The pause mode allows each of the modules to finish up their operations, reaching a point where each individual module motor may be turned off and returned to a command-response mode, block 412. At this point, block 414, tho module inserts a busy line into the multi-drop line indicating that each module has completed its operation to a convenient point, and that individual modules are synchronized with respect to an up or down stream module. Piece records at this stage are not transferred, but the serial data link is now clear for the response in command-response mode, block 416. Beginning at the base unit, a status request command is issued, block 418, along the serial data bus 116, received first by module 102, with a status request. If the status request of module 102 returns negative, the signal is passed along bus 118 to module 104 and a similar request made of module 104. This operation is indicated in decision block 420, wherein a NO response of a status request to module 102 will result in the next successive down stream module address added to the status request, block 422, and the cycle repeating in 418 requesting the issuance of a report, this time in the next successive module. Should this module now respond with an error response, block 424, an appropriate status report will be provided to the base unit, along with the message to be displayed on screen. As indicated above, each module contains the entire text of the message for each of the respective errors which a module may wish to display in the base unit display. Thus, the module responds with its address plus a message, which is passed through along the serial data link 116 along successive modules to the base unit for display on the base unit display screen. This is indicated in block 426. At this point, operator intervention is awaited, block 428. Additional message indicators may be provided in each respective module, such as red and green display lights indicating such errors as OUT OF PAPER, PAPER JAM and the like. If an OUT OF PAPER is displayed in the operator screen, the operator then is provided with an indication to that effect, either in the form of a visual or audible alarm, and the entire operation of the machine is placed in a suspended operation until the operator has reset the mechanism to correct the error. At this point, piece records are still awaiting transfer in their respective microprocessors in each of the modules, and the system is on suspension pending restart, indicated in block 430. Once the error is corrected, the operator re-starts, and the operation then resumes. Resumption of the operation resumes continuing successive scans, block 432. The error scan operation then repeats itself. Along with the resumption of the scan operation, a record is kept, block 434, of the errors occurring throughout the system. The base unit keeps an accumulative count of errors per run, along with the types of errors. The error may be stored at the moment of storage of block 412, when the module has finished its preceding operation. This error record is added to the piece record. The piece record is passed on the serial link from module to module, as explained above, until it reaches the base unit. Thus, the base unit may keep track of errors by storing, from each piece record as it is received, the location and type of error. Such data may be derived totally from the piece record after the base unit receives same, and may include other additional information which is stored as a result of piece record report requirements, including piece count, collation errors, jams, etc.

The piece record includes the length of the record, number of bytes, including control bytes, the control bytes containing bits indicating whether paper is present, the last piece tag, whether collation is in error in batch processing, first piece, last piece, presence or absence of the control document, functions for downstream modules, selections made according to collation records or document numbers, and other additional information. The current preferred length of piece record is 256 bytes for the purpose of conserving memory; however, it will be understood that the piece record may be varied in accordance with operator needs.

There is a local handshaking operation between modules and between modules and the base unit, noted in FIG. 5, and designated in buses 108, 110, 112, 114 . . . etc. Local handshaking includes information such as, piece ready, piece record release, piece release, etc., all of which are utilized for specific control of transmission of upstream module documents by release from the queuing station to the next successive downstream module. Each of the respective sensors indicated in FIG. 2 serve as part of the error indication for each module. The sensors are used to point out error flags to the local microprocessor and each respective module on a timing basis for indicating whether or not documents are in the proper location and the proper sequence. Any error indicated by improper sensing of documents at the incorrect time results in the placement of an error flag in the local microprocessor, and these errors are picked up during system status checks periodically made along the multidrop global serial parallel data bus line, as described above.

Figure 15:
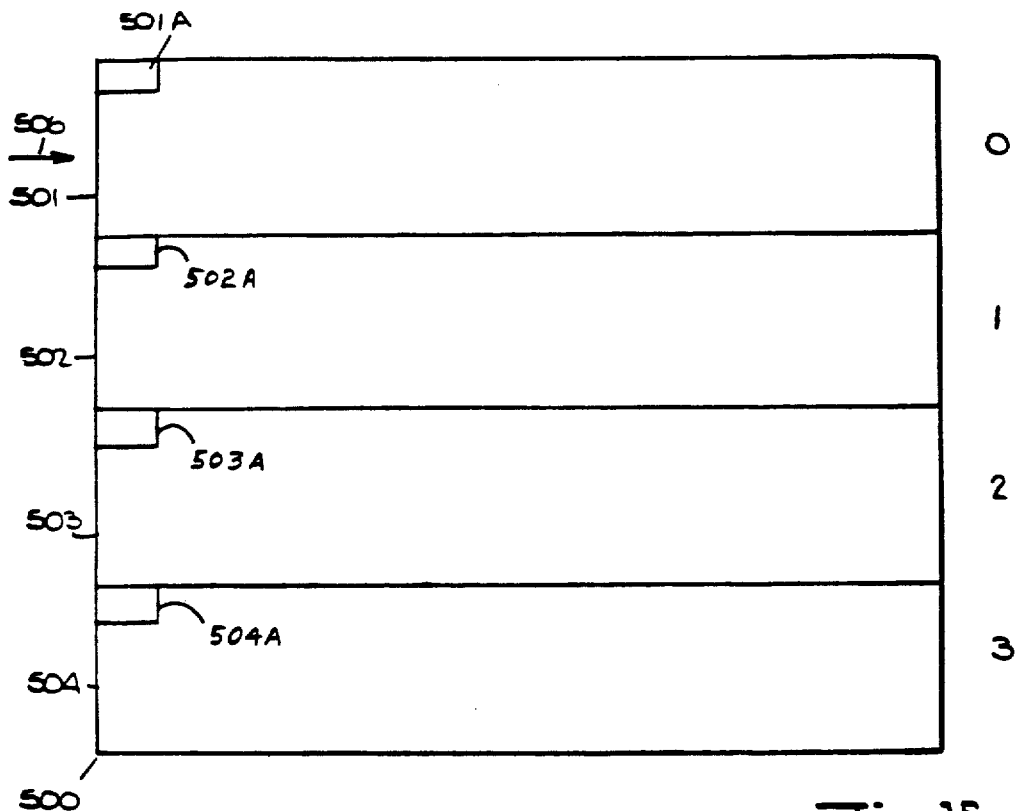
FIG. 15 is a memory map illustrating the translation routine.
Figure 16:
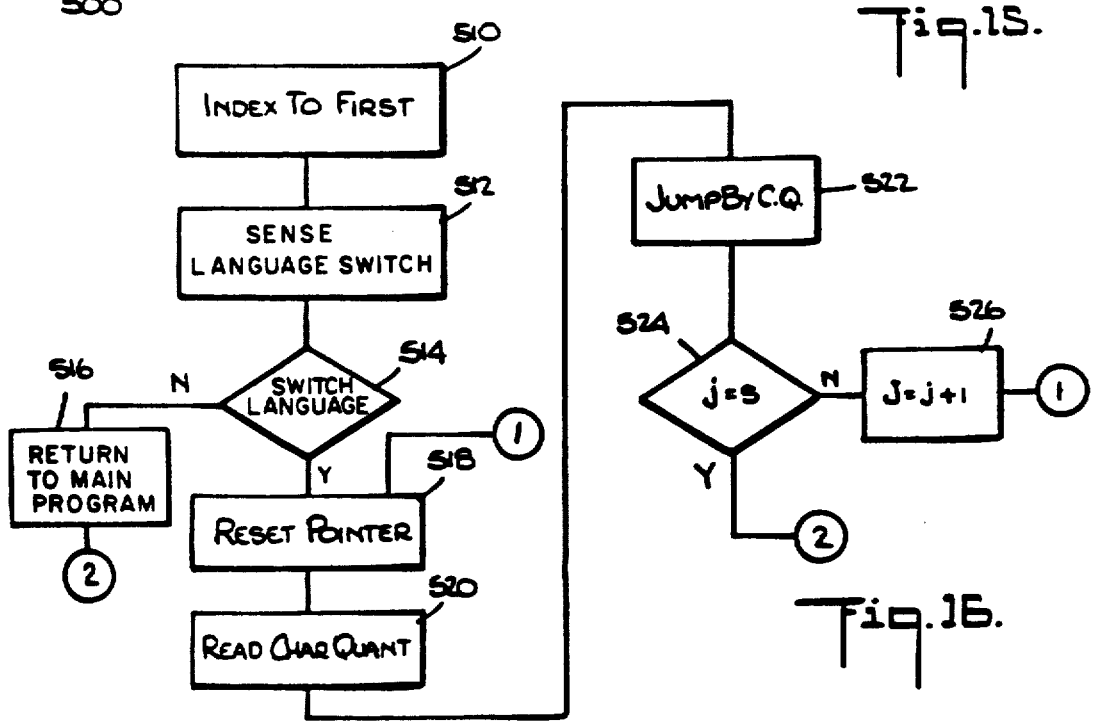
FIG. 16 is a program routine and system flow chart illustrating the translation routine.

The unique operation of permitting each individual module to have entirely pre-stored error messages within each module allows for multi-language translation to be utilized in conjunction with the present invention. In this instance each module is provided with an EPROM, containing an plurality of pre-stored messages, including messages such as OUT OF PAPER, PAPER JAM and other messages relating to the feeding of multiple documents at each respective feed stations, translated into as many different languages as may be conceivably employed for units shipped anywhere in the world. Thus, the advantage of encoding EPROM on this basis is that individual coding of error messages on a customized basis depending upon the specific language requirement of the user need not be done on a customer-by-customer basis. The system is effected in the present invention by the use of a multi-language translation selection, which is selected upon startup with each respective machine operation. The difficulty encountered with multiple languages is the difference in the number of letters for each message, and the present invention provides a unique method of indexing through a variable character set, in accordance with how many characters each message contains. The system operates on a pointer basis. Thus, referring to FIG. 15, a memory map shows the arrangement wherein a plurality of messages, four by way of example, are stored in an EPROM, each message taking up a specific, but necessarily different, amount of pre-stored space, constituting pluralities of characters. It will be understood that additional languages may be feasible, and that many error messages may be present. Thus, the first message indicated as block 501 may be in English, whereas the successive messages constituting the same message but in another language and occupying a different message length is shown at 502, 503 and 504 respectively. Thus, the error message shown on at 501 may be in English, 502 may be in French, 503 in German, and 504 in Spanish. The translation subroutine for selecting appropriate message is illustrated in FIG. 16, and forms part of the subroutine of the startup operations. The first step of the subroutine is to index the pointer 506 to the first message shown in block 510, and referring to EPROM memory storage location area 501. The system automatically defaults to English, which is indexed as the first message, and then allows the operator to switch languages. The sensing of the switching of languages, block 512, carries in decision block 514. The sensing may result from a manually set switch or a keyboard entered response to a screen displayed question. A NO response, indicating that languages are not to be switched, allows the subroutine to return to the main program, block 516. Should there be a language switch, the pointer 506 is reset depending upon the language selected. The system employs a multiplier concept, meaning that if the second language is selected, block 502, a multiplier of 1 is provided. The third language, block 503, is a multiplier of 2, and the fourth language is a multiplier of 3. The first character of each language indicates the number of characters present in that respective language, this block is indicated as first character byte 501A of block 501, 502A of block 502, 503A of block 503 and 504A of block 504. The language switch step 512, FIG. 16, will indicate specific multipliers for the pointer 506 reset in block 518. As the pointer is reset, from block 501 to 502 if a number greater than 0 is selected, the pointer will move to the first byte position 502A from byte position 501A by the amount of characters indicated in the first byte position 501A and amounting to the number of characters stored in the first message translation plus one. Thus, if there are 40 characters in English, byte 501A will indicate 41 characters present in message 501. The additional character represents the byte storing the character information. If the pointer is to be reset, pointer 506 moves to the first byte portion of the language indicated by its multiplier, 1, 2, 3, which is an indication the number of times the reset operation is to take place. Thus, if language block 504 selected, the multiplier is 3, the software routine first analyzes character byte position 501A, determines the number of characters, and jumps to character position 502A. This is only the first iteration. If 3 iterations have been selected, the operation repeats itself a second time, moving to block 503A, calculating the move by the number of character positions stored at the first pointer indexing position found in block 502A. The operation then repeats again, causing the translation pointer to point to block 504A, which is the selected language. Thus, as shown in FIG. 16 after the initial pointer reset, block 518, the character quantity is read, block 520, and the pointer jumps by the character quantity, block 522. At this point, if the number of jumps equals the language selection multiplier, decision block 524, then the program routine returns to the startup subroutine, block 516. If it does not, then the jump counter is incremented by 1, block 526, and program returns to block 518 for a repeat of the operation. The operation continues to recycle until the jump(s) equals the selected multiplier language(s), thereby indicating the pointer now at the correct language translation error message.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this contribution to the art and, therefore, such adaptations should and are intended to be comprehended within the meaning and range of equivalence Of the appended claims.

I claim:

1. In a material processing system comprising a plurality of material processing stations and means for transporting articles to be processed serially through said material processing stations in a given order, the improvement comprising:

a processing station computer in each of said material processing stations, one of said computers operating as a central processor and the remaining processing station computers operating as peripheral processors;

a first data channel serially interconnecting each of said peripheral processors with said central processor;

a second data channel connecting each of said peripheral processors directly with said central processor; and a third data channel interconnecting each of said processing station computers with adjacent ones of said processing station computers, said first, second and third data channels each performing a different data processing operation for controlling serial processing of articles transported through said material processing stations, wherein during run mode each of said peripheral processors generates a record of operation and error messages, said peripheral processor passing the record of operation to a successive serially connected one of said peripheral processors along said third data channel, and passing said error messages along said second data channel, said first data channel being rendered inoperative during said run mode 2. The material processing system of claim 1 wherein each of said peripheral processors generates a completion of operation signal and a ready to receive signal, said peripheral processors each passing said signals to appropriate adjacent ones of said peripheral processors along said third data channel, said third data channel being a bidirectional data link.

3. The material processing system of claim 1 wherein each peripheral processor processes material at a respective material processing station until completion or interruption error, said completion signalled by first means for passing a completion signal along said third data channel, said error signalled to said central processor by second means for passing said error signal from said peripheral processor along said second data channel, said second means operating independently of said first means whereby each of said peripheral processors will cause said respective material processing station to process to completion regardless of an error causing interruption in the other of said material processing stations.

4. The material processing system of claim 1 wherein each of said peripheral processors includes a microprocessor, an input buffer and an output buffer, and a signal passage port controller, said signal passage port controller passing signals from an upstream adjacent one of said processing station computers to a lower adjacent one of said processing station computers along said first data channel.

5. In a material processing system comprising a plurality of material processing stations and means for transporting articles to be processing stations and means material processing stations in a given order, the improvement comprising
- a processing station computer in each of said material processing stations, one of said processing station computers operating as a central processor and the remaining processing station computers operating as peripheral processors;
- a first data channel serially interconnecting each of said peripheral processors with said central processor;
- a second data channel connecting each of said peripheral processors directly with said central processor; and
- a third data channel interconnecting each of said processing station computers with adjacent ones of said processing station computers, each of said first, second and third data channels performing a different data processing operation for controlling serial processing for transporting articles;
- wherein the material processing system operates in at least a start-up mode and a run mode, and during said start-up mode said central processor operates as a master controller processing signals along said first data channel, each of said peripheral processors operating independently of the other peripheral processors and said central processor during said run mode, and wherein during said run mode each peripheral processor generates a record of operation and can generate error messages, said peripheral processor passing the record of operation to a successive serially connected one of said peripheral processors along said third data channel, and passing said error messages along said second data channel, said first data channel being rendered inoperative during said run mode.

6. In a material processing system comprising a plurality of material processing stations and means for transporting articles to be processed serially through said material processing stations in a given order during insert mode of operation, the improvement comprising
- a processing station computer in each of said material processing stations, one of said processing station computers operating as a central processor and the remaining processing station computers operating as peripheral processors;
- a first data channel serially interconnecting each of said peripheral processors with said central processor;
- a second data channel connecting each of said peripheral processors directly with said central processor; and
- a third data channel interconnecting each of said processing station computers with adjacent ones of said processing station computers, said first, second and third data channels each performing a different data processing operation for controlling serial processing of articles transported through said material processing stations; and
- wherein said processing station computers communicate during insert mode of operation at a station to station level along said third data channel and during other modes of operation at a command-response level along said first data channel.

* * * * *